(12) United States Patent
Woodley

(10) Patent No.: US 10,166,987 B2
(45) Date of Patent: Jan. 1, 2019

(54) CONTROL SYSTEM AND METHOD

(71) Applicant: Jaguar Land Rover Limited, Whitley, Coventry, Warwickshire (GB)

(72) Inventor: Jonathan Woodley, Warwick (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 152 days.

(21) Appl. No.: 15/119,948

(22) PCT Filed: Jan. 23, 2015

(86) PCT No.: PCT/EP2015/051399
§ 371 (c)(1),
(2) Date: Aug. 18, 2016

(87) PCT Pub. No.: WO2015/124378
PCT Pub. Date: Aug. 27, 2015

(65) Prior Publication Data
US 2017/0057511 A1    Mar. 2, 2017

(30) Foreign Application Priority Data

Feb. 18, 2014 (GB) .................................. 1402878.1

(51) Int. Cl.
*B60K 28/12* (2006.01)
*B60W 30/188* (2012.01)
(Continued)

(52) U.S. Cl.
CPC ........... *B60W 30/188* (2013.01); *B60K 28/04* (2013.01); *B60K 28/12* (2013.01); *B60W 10/04* (2013.01);
(Continued)

(58) Field of Classification Search
None
See application file for complete search history.

(56) References Cited

U.S. PATENT DOCUMENTS 5,771,481 A    6/1998  Gilling
6,135,230 A *  10/2000 Schenck ............... B60K 28/04
                                                180/269
(Continued)

FOREIGN PATENT DOCUMENTS

DE    102005041853 A1    3/2007
DE    102007019479 A1    1/2008
(Continued)

OTHER PUBLICATIONS

Combined Search and Examination Report for application No. GB1402878.1, dated Sep. 16, 2014, 5 pages.
(Continued)

*Primary Examiner* — Justin Holmes
(74) *Attorney, Agent, or Firm* — Reising Ethington P.C.

(57) ABSTRACT

Embodiments of the present invention provide a system comprising: a first controller operable to assume one of a plurality of respective states, in a first state the first controller being configured automatically to cause a powertrain to develop drive torque and cause a vehicle to operate in accordance with a target speed value, the first controller being configured to receive a door state indicator signal indicative of whether a door is in an open or closed state, and an occupant presence indicator signal indicative of whether an occupant is present in a given seat of a vehicle, the system being configured not to permit operation of the first controller in the first state in dependence on the door state indicator signal and the occupant presence indicator signal.

19 Claims, 12 Drawing Sheets

(51) Int. Cl.
*B60K 28/04* (2006.01)
*B60W 30/14* (2006.01)
*B60W 10/04* (2006.01)
*B60W 10/10* (2012.01)
*B60W 10/184* (2012.01)

(52) U.S. Cl.
CPC .......... *B60W 10/10* (2013.01); *B60W 10/184* (2013.01); *B60W 30/143* (2013.01); *B60W 2710/105* (2013.01); *B60W 2710/18* (2013.01); *B60W 2720/10* (2013.01)

(56) References Cited

U.S. PATENT DOCUMENTS

| 9,150,208 B2* | 10/2015 | Schemmel | B60T 17/18 |
| 2007/0028888 A1 | 2/2007 | Jasem | |
| 2010/0222976 A1 | 9/2010 | Haug | |
| 2014/0172240 A1 | 6/2014 | Schemmel | |
| 2014/0244131 A1 | 8/2014 | Mielich et al. | |
| 2014/0350806 A1* | 11/2014 | Koike | B60W 10/184 |
| | | | 701/53 |
| 2015/0224989 A1 | 8/2015 | Fairgrieve et al. | |

FOREIGN PATENT DOCUMENTS

| DE | 102009055972 A1 | 6/2011 |
| EP | 0992386 A1 | 4/2000 |
| EP | 2769895 A1 | 8/2014 |
| GB | 2295695 A | 6/1996 |
| GB | 2508690 A | 6/2014 |

OTHER PUBLICATIONS

International Search Report for International application No. PCT/EP2015/051399, dated Jul. 17, 2015, 7 pages.
Written Opinion for International application No. PCT/EP2015/051399, dated Jul. 17, 2015, 7 pages.

* cited by examiner

CONTROL SYSTEM AND METHOD

INCORPORATION BY REFERENCE

The content of UK patent applications GB2492748, GB2492655 and GB2499252 is incorporated herein by reference.

TECHNICAL FIELD

The present invention relates to vehicle speed control systems. In particular but not exclusively the invention relates to monitoring of vehicle speed control systems to ensure correct operation.

BACKGROUND

In known vehicle speed control systems, typically referred to as cruise control systems, the vehicle speed is maintained on-road once set by the user without further intervention by the user so as to improve the driving experience for the user by reducing workload.

With typical cruise control systems, the user selects a speed at which the vehicle is to be maintained, referred to as a set-speed, and the vehicle is maintained at a target speed that is set equal to the set-speed for as long as the user does not apply a brake or, in the case of a vehicle having a manual transmission, depress a clutch pedal. The cruise control system takes its speed signal from a driveshaft speed sensor or wheel speed sensors. When the brake or the clutch is depressed, the cruise control system is disabled so that the user can override the cruise control system to change the vehicle speed without resistance from the system. If the user depresses the accelerator pedal by a sufficient amount the vehicle speed will increase, but once the user removes his foot from the accelerator pedal the vehicle reverts to the pre-set cruise speed (set-speed) by coasting.

Such systems are usually operable only above a certain speed, typically around 15-20 kph, and are ideal in circumstances in which the vehicle is travelling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly, to maintain a safe following distance.

Known cruise control systems also cancel in the event that a wheel slip event is detected requiring intervention by a traction control system (TC system or TCS) or stability control system (SCS). Accordingly, they are not well suited to maintaining vehicle progress when driving in off road conditions where such events may be relatively common.

It is an aim of embodiments of the present invention to address disadvantages associated with the prior art.

SUMMARY OF THE INVENTION

Embodiments of the invention may be understood with reference to the appended claims.

Aspects of the present invention provide a system, a vehicle and a method.

In one aspect of the invention for which protection is sought there is provided a system comprising:
 a first controller operable to assume one of a plurality of respective states, in a first state the first controller being configured automatically to cause a powertrain to develop drive torque and cause a vehicle to operate in accordance with a target speed value,
 the first controller being configured to receive
 a door state indicator signal indicative of whether a door is in an open or closed state, and
 an occupant presence indicator signal indicative of whether an occupant is present in a given seat of a vehicle,
 the system being configured not to permit operation of the first controller in the first state in dependence on the door state indicator signal and the occupant presence indicator signal.

The system has the advantage that the first controller may be prevented from causing a powertrain to develop drive torque in dependence on the door state indicator signal and the occupant presence indicator signal. In some embodiments, the system may therefore ensure that an occupant, and optionally that a driver, is present in the vehicle and the doors are closed before the system permits the speed controller automatically to cause a powertrain to develop drive torque.

It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The speed controller may be implemented in software run on one or more processors. One or more other controllers may be implemented in software run on one or more processors, optionally the same one or more processors as the speed controller. Other arrangements are also useful.

Optionally the system may be configured wherein if the door indicator signal indicates the door is not in the closed state and the occupant presence indicator signal indicates an occupant is not present, the system is configured not to permit operation of the first controller in the first state.

Optionally the system may be configured wherein the first controller is further configured automatically to cause application of a brake to one or more wheels thereby to cause a vehicle to operate in accordance with the target speed value.

Thus the first controller may be arranged to cause application of a brake as required in order to cause a vehicle to operate in accordance with the target speed value.

Optionally the first controller may be further configured automatically to cause application of a brake to one or more wheels when in the first state.

Optionally the first controller may be further operable in a second state in which the first controller is not permitted automatically to cause a powertrain to develop drive torque.

Optionally the first controller may be further configured in the second state automatically to cause application of a brake to one or more wheels in order to cause a vehicle to operate in accordance with the target speed value.

Thus in the second state the first controller may be configured to cause a brake to be applied to one or more wheels when required in order to cause a vehicle to operate in accordance with the target speed value. In some embodiments the brake may be applied in order to prevent vehicle speed from exceeding the target speed value, this may be useful for example when a vehicle is descending a slope under gravity since the first controller may automatically cause application of a brake to prevent vehicle speed from exceeding the target speed.

Optionally the system may be configured wherein if the first controller is in the first state and the controller determines that door state indicator signal indicates the door is not in the closed state or that the occupant presence indicator signal indicates an occupant is not present, the first controller assumes operation in a predetermined state other than the first state wherein the predetermined state is a state in which the first controller is not permitted to generate the first controller powertrain signal to cause a powertrain to develop positive drive torque.

Optionally the system may be configured wherein the predetermined state is the second state.

Optionally the system may be configured to cause a gradual reduction in the amount of any drive torque applied by a powertrain in response to the first controller powertrain signal when a transition from the first state to the predetermined state is made in response to the door indicator signal and occupant presence indicator signal.

Optionally the system may be configured to cause a gradual reduction in the amount of any drive torque applied according to a ramp function, and wherein the ramp function comprises at least one selected from amongst a substantially linear ramp function and a substantially non-linear ramp function.

Optionally if the first controller is in the second state the system may be configured to prevent the first controller from assuming the first state if the door indicator signal indicates the door is not in the closed state or the occupant presence indicator signal indicates an occupant is present.

Optionally the first controller may be further configured to assume an off state in which the first controller does not cause said vehicle to operate in accordance with a target speed value.

Optionally the system may be configured wherein when the first controller is in the off state the first controller is not permitted to assume a state other than the off state in response to a user request to assume a state other than the off state in dependence on the door state indicator signal and the occupant presence indicator signal.

Optionally the system may be configured wherein the occupant presence indicator signal is indicative of whether an occupant is present in a driver seat of a vehicle.

Optionally the system may be configured wherein the occupant presence indicator signal is signal indicative of whether an occupant restraint device is in an in-use condition being a condition in which it performs a predetermined occupant restraint function.

For example, in the case of a seat belt device, the in-use condition may be a condition in which a latch plate of the seat belt device is coupled to a buckle of the seat belt device. This may be referred to as a deployed condition, i.e. the occupant restraint device is in the condition in which it performs a predetermined intended occupant restrain function.

Optionally the system may be configured wherein the occupant presence indicator signal is signal indicative of whether a seat belt of a seat is secured in a deployed position.

It is to be understood that some vehicles may have a plurality of seats and a corresponding plurality of occupant restraint devices. In some embodiments, only the state of the occupant restraint device associated with a driver seat is monitored by the system to determine whether the first controller may assume a predetermined state.

In some embodiments the occupant presence indicator signal (which may be an occupant restraint device state indicator signal) may be arranged to indicate the state of each occupant restraint device regardless of whether a seat is occupied. In some embodiments having such an occupant restraint device state indicator signal, a further signal may be provided indicating which seats are occupied. In this case the system may be configured to prevent operation of the first controller in the first state in dependence on the occupant restraint device state indicator signal associated with one or more occupied seats only.

In some alternative embodiments, the occupant restraint device state indicator signal may provide an indication of the state of an occupant restraint device associated only with an occupied seat.

Other arrangements are also useful.

In one aspect of the invention for which protection is sought there is provided a motor vehicle comprising a system according to another aspect.

In an aspect of the invention for which protection is sought there is provided a vehicle comprising a chassis, a body attached to said chassis, a plurality of wheels, a powertrain to drive said wheels, a braking system to brake said wheels, and a system according to another aspect.

In a further aspect of the invention for which protection is sought there is provided a method of operating a controller configured to assume one of a plurality of respective states, wherein in a first state the first controller is configured to cause a powertrain to develop drive torque and cause a vehicle to operate in accordance with a target speed value, the method comprising:
  determining if one or more vehicle doors are in an open or closed state, and
  determining if an occupant is present in a seat of a vehicle, the method comprising not permitting operation of the first controller in the first state in dependence on a determination whether a vehicle door is in an open state, or whether an occupant is present in a seat of a vehicle.

The method may comprise determining if one or more vehicle doors are in an open or closed state comprises receiving a door state indicator signal indicative of whether a door is in said open or closed state; and determining if an occupant is present in a seat of a vehicle comprises receiving an occupant presence indicator signal indicative of whether an occupant is present in a seat of a vehicle.

Optionally, determining whether an occupant is present in a seat of a vehicle comprises determining whether an occupant is present in a driver seat of a vehicle.

Optionally, receiving an occupant presence indicator signal indicative of whether an occupant is present in a seat of a vehicle comprises receiving an occupant restraint device state indicator signal indicative of whether an occupant restraint device is in an in-use condition being a condition in which it performs a predetermined occupant restraint function.

The method may comprise: when the controller is in the first state, if it is determined that the door is not in the closed state or that an occupant is not present, operating the controller to transition to a predetermined state other than the first state, wherein the predetermined state is a state in which the first controller is not permitted to cause a powertrain to develop positive drive torque.

Optionally the predetermined state is a second state in which the controller is configured to cause application of a brake to one or more wheels thereby to cause a vehicle to operate in accordance with the target speed value, and is configured not cause a powertrain to develop positive drive torque to cause a vehicle to operate in accordance with the target speed value.

The method may comprise:
when transitioning from the first state to the second state, applying a gradual reduction in the amount of any drive torque applied by a powertrain according to a ramp function, and whereby the ramp function comprises at least one selected from amongst a substantially linear ramp function and a substantially non-linear ramp function.

In one aspect of the invention for which protection is sought there is provided a method of operating a controller configured to assume one of a plurality of respective states, wherein in a first state the first controller is configured to cause a powertrain to develop drive torque and cause a vehicle to operate in accordance with a target speed value, the method comprising:
determining if one or more vehicle doors are in an open or closed state, and
determining if an occupant is present in a seat of a vehicle, the method comprising not permitting operation of the first controller in the first state if it is determined that a vehicle door is in an open state, or that an occupant is not present in a seat of a vehicle.

In one aspect of the invention for which protection is sought there is provided a carrier medium carrying computer readable code for controlling a vehicle to carry out the method of another aspect.

In one aspect of the invention for which protection is sought there is provided a computer program product executable on a processor so as to implement the method of another aspect.

In one aspect of the invention for which protection is sought there is provided a computer readable medium loaded with the computer program product of another aspect.

In one aspect of the invention for which protection is sought there is provided a processor arranged to implement the method of another aspect.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

References herein to a block such as a function block are to be understood to include reference to software code for performing the function or action specified which may be an output that is provided responsive to one or more inputs. The code may be in the form of a software routine or function called by a main computer program, or may be code forming part of a flow of code not being a separate routine or function. Reference to function block is made for ease of explanation of the manner of operation of embodiments of the present invention.

Figure 1:
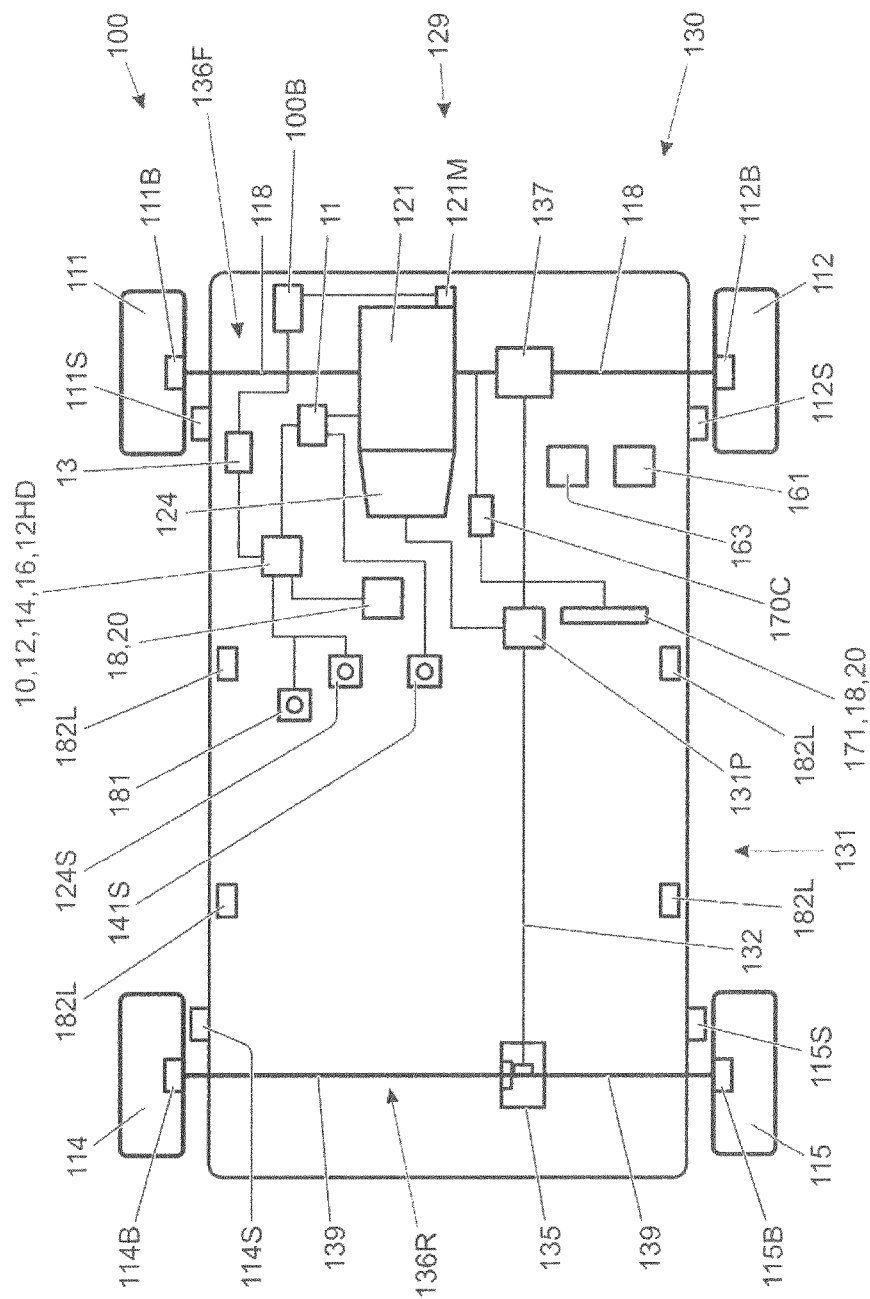
FIG. 1 is a schematic illustration of a vehicle according to an embodiment of the invention in plan view.

FIG. 1 shows a vehicle 100 according to an embodiment of the present invention. The vehicle 100 has a powertrain 129 that includes an engine 121 that is connected to a driveline 130 having an automatic transmission 124. It is to be understood that embodiments of the present invention are also suitable for use in vehicles with manual transmissions, continuously variable transmissions or any other suitable transmission.

In the embodiment of FIG. 1 the transmission 124 may be set to one of a plurality of transmission operating modes, being a park mode P, a reverse mode R, a neutral mode N, a drive mode D or a sport mode S, by means of a transmission mode selector dial 124S. The selector dial 124S provides an output signal to a powertrain controller 11 in response to which the powertrain controller 11 causes the transmission 124 to operate in accordance with the selected transmission mode.

The driveline 130 is arranged to drive a pair of front vehicle wheels 111, 112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The front wheels 111, 112 in combination with the front drive shafts 118 and front differential 137 may be referred to as a front axle 136F. The rear wheels 114, 115 in combination with rear drive shafts 139 and rear differential 135 may be referred to as a rear axle 136R.

The wheels 111, 112, 114, 115 each have a respective brake 111B, 112B, 114B, 115B. Respective speed sensors 111S, 112S, 114S, 115S are associated with each wheel 111, 112, 114, 115 of the vehicle 100. The sensors 111S, 112S, 114S, 115S are mounted to a chassis 100C of the vehicle 100 and arranged to measure a speed of the corresponding wheel.

Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing operation in a two wheel drive mode or a four wheel drive mode. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
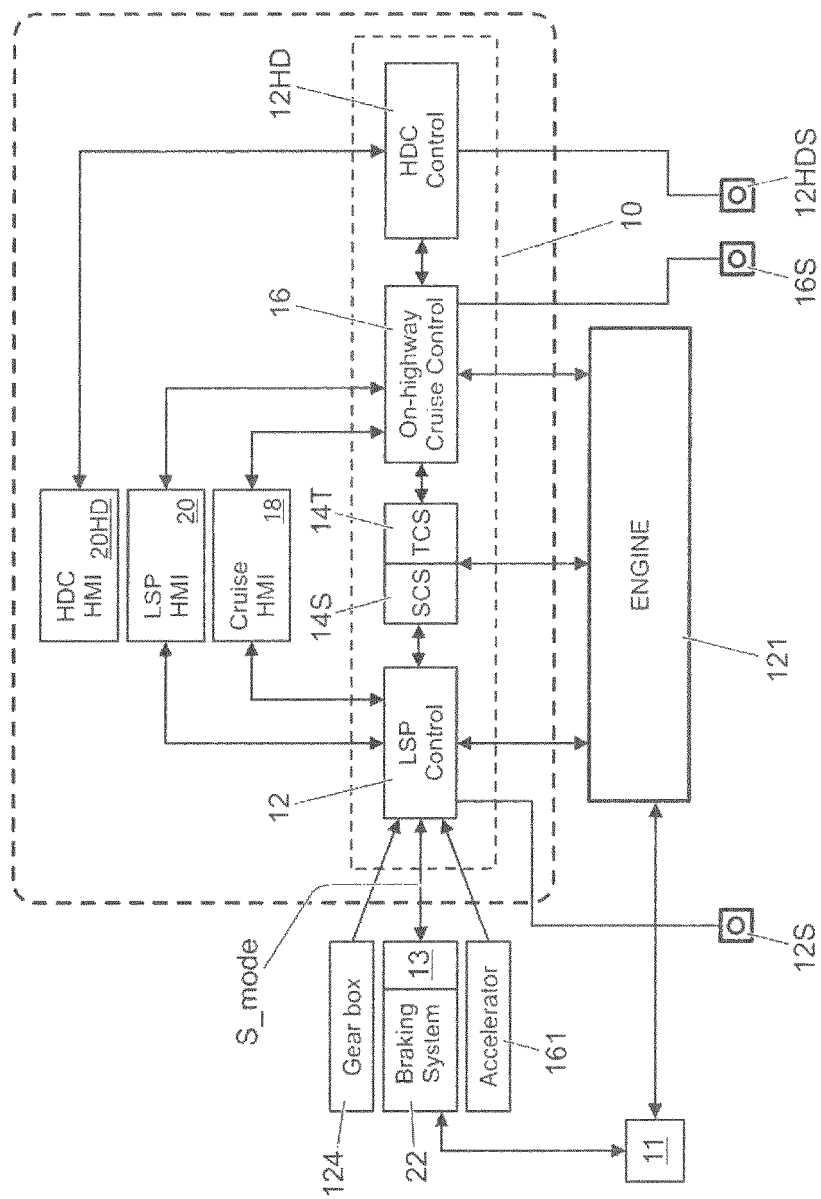
FIG. 3 is a high level schematic diagram of an embodiment of the vehicle speed control system of the present invention, including a cruise control system and a low-speed progress control system.

A control system for the vehicle engine 121 includes a central controller 10, referred to as a vehicle control unit (VCU) 10, the powertrain controller 11, a brake controller 13 and a steering controller 170C. The brake controller 13 is an anti-lock braking system (ABS) controller 13 and forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3, a stability control system (SCS) 14S, a traction control system (TCS) 14T, a cruise control system 16 and a Hill Descent Control (HDC) system 12HD. The SCS 14S improves stability of the vehicle 100 by detecting and managing loss of traction when cornering. When a reduction in steering control is detected, the SCS 14S is configured automatically to command a brake controller 13 to apply one or more brakes 111B, 112B, 114B, 115B of the vehicle 100 to help to steer the vehicle 100 in the direction the user wishes to travel. If excessive wheel spin is detected, the TCS 14S is configured to reduce wheel spin by application of brake force in combination with a reduction in powertrain drive torque. In the embodiment shown the SCS 14S and TCS 14T are implemented by the VCU 10. In some alternative embodiments the SCS 14S and/or TCS 14T may be implemented by the brake controller 13. Further alternatively, the SCS 14S and/or TCS 14T may be implemented by separate controllers.

Similarly, one or more of the controllers 10, 11, 13, 170C may be implemented in software run on a respective one or more computing devices such as one or more electronic control units (ECUs). In some embodiments two or more controllers may be implemented in software run on one or more computing devices. Two or more controllers may be implemented in software in the form of a combined software module, or a plurality of respective modules each implementing only one controller.

One or more computing devices may be configured to permit a plurality of software modules to be run on the same computing device without interference between the modules. For example the computing devices may be configured to allow the modules to run such that if execution of software code embodying one module terminates erroneously, or the computing device enters an unintended endless loop in respect of one of the modules, it does not affect execution by one or more computing devices of software code comprised by a software module embodying the second controller.

It is to be understood that one or more of the controllers 10, 11, 13, 170C may be configured to have substantially no single point failure modes, i.e. one or more of the controllers may have dual or multiple redundancy. It is to be understood that robust partitioning technologies are known for enabling redundancy to be introduced, such as technologies enabling isolation of software modules being executed on a common computing device. It is to be understood that the common computing device will typically comprise at least one microprocessor, optionally a plurality of processors, which may operate in parallel with one another. In some embodiments a monitor may be provided, the monitor being optionally implemented in software code and configured to raise an alert in the event a software module is determined to have malfunctioned.

The SCS 14S, TCS 14T, ABS controller 22C and HDC system 12HD provide outputs indicative of, for example, SCS activity, TCS activity and ABS activity including brake interventions on individual wheels and engine torque requests from the VCU 10 to the engine 121, for example in the event a wheel slip event occurs. Each of the aforementioned events indicate that a wheel slip event has occurred. Other vehicle sub-systems such as a roll stability control system or the like may also be present.

Figure 5:
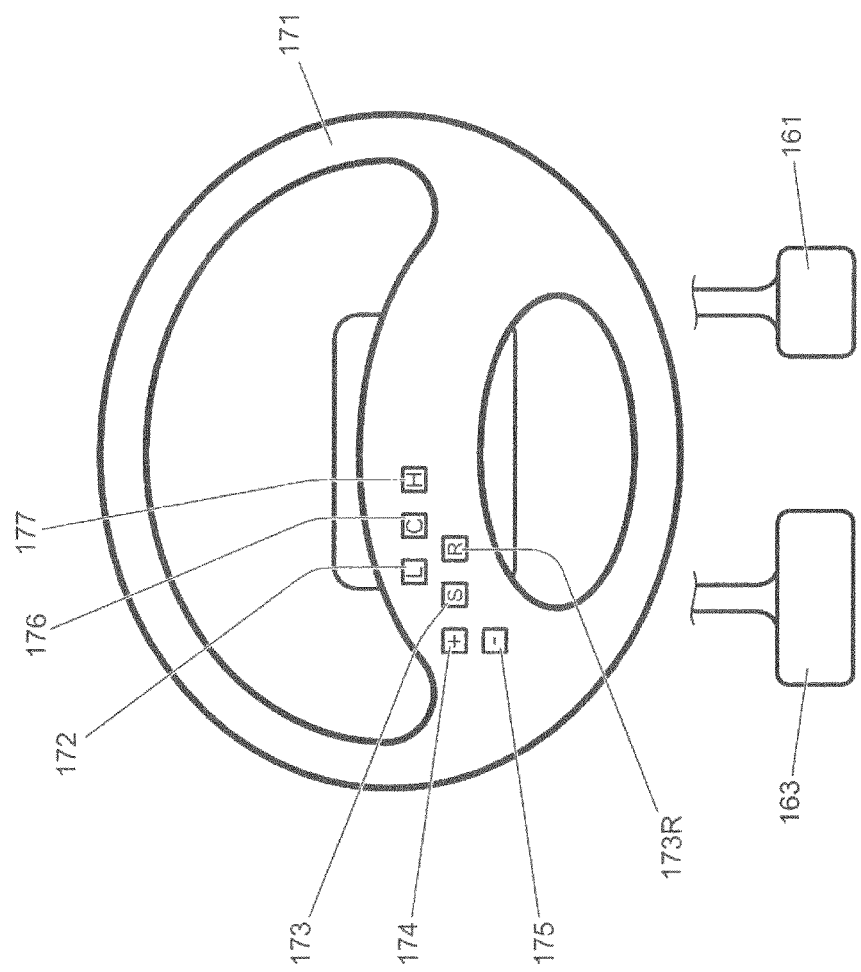
FIG. 5 illustrates a steering wheel and brake and accelerator pedals of a vehicle according to an embodiment of the present invention.

As noted above the vehicle 100 includes a cruise control system 16 which is operable to automatically maintain vehicle speed at a selected speed when the vehicle is travelling at speeds in excess of 25 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 5). The cruise control system 16 may be switched on by pressing a cruise control system selector button 176. When the cruise control system 16 is switched on, depression of a 'set-speed' control 173 sets the current value of a cruise control set-speed parameter, cruise_set-speed to the current vehicle speed. Depression of a '+' button 174 allows the value of cruise_set-speed to be increased whilst depression of a '−' button 175 allows the value of cruise_set-speed to be decreased. A resume button 173R is provided that is operable to control the cruise control system 16 to resume speed control at the instant value of cruise_set-speed following driver over-ride. It is to be understood that known on-highway cruise control systems including the present system 16 are configured so that, in the event that the user depresses the brake or, in the case of vehicles with a manual transmission, a clutch pedal, the cruise control function is cancelled and the vehicle 100 reverts to a manual mode of operation which requires accelerator pedal input by a user in order to maintain vehicle speed. In addition, detection of a wheel slip event, as may be initiated by a loss of traction, also has the effect of cancelling the cruise control function. Speed control by the system 16 is resumed if the driver subsequently depresses the resume button 173R.

The cruise control system 16 monitors vehicle speed and any deviation from the target vehicle speed is adjusted automatically so that the vehicle speed is maintained at a substantially constant value, typically in excess of 25 kph. In other words, the cruise control system is ineffective at speeds lower than 25 kph. The cruise control HMI 18 may also be configured to provide an alert to the user about the status of the cruise control system 16 via a visual display of the HMI 18. In the present embodiment the cruise control system 16 is configured to allow the value of cruise_set-speed to be set to any value in the range 25-150 kph.

The LSP control system 12 also provides a speed-based control system for the user which enables the user to select a very low target speed at which the vehicle can progress without any pedal inputs being required by the user. Low-speed speed control (or progress control) functionality is not provided by the on-highway cruise control system 16 which operates only at speeds above 25 kph.

The LSP control system 12 is activated by means of a LSP control system selector button 172 mounted on the steering wheel 171. The system 12 is operable to apply selective powertrain, traction control and braking actions to one or more wheels of the vehicle 100, collectively or individually, to maintain the vehicle 100 at the desired speed.

The LSP control system 12 is configured to allow a user to input a desired value of set-speed parameter, LSP_set-speed to the LSP control system 12 via a low-speed progress control HMI (LSP HMI) 20 (FIG. 1, FIG. 3) which shares certain input buttons 173-175 with the cruise control system 16 and HDC control system 12HD. Provided the vehicle speed is within the allowable range of operation of the LSP control system (which is the range from 2 to 30 kph in the present embodiment although other ranges are also useful) the LSP control system 12 controls vehicle speed in accordance with the value of LSP_set-speed. Unlike the cruise control system 16, the LSP control system 12 is configured to operate independently of the occurrence of a traction event. That is, the LSP control system 12 does not cancel speed control upon detection of wheel slip. Rather, the LSP control system 12 actively manages vehicle behaviour when slip is detected.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed") by means of the 'set-speed' button 173 and the '+'/'−' buttons 174, 175 in a similar manner to the cruise control system 16. The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of the brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20.

The HDC system 12HD is configured to limit vehicle speed when descending a gradient. When the HDC system 12HD is active, the system 12HD controls the braking system 22 (via brake controller 13) in order to limit vehicle speed to a value corresponding to that of a HDC set-speed parameter HDC_set-speed which may be set by a user. The HDC set-speed may also be referred to as an HDC target speed. Provided the user does not override the HDC system by depressing the accelerator pedal when the HDC system 12HD is active, the HDC system 12HD controls the braking system 22 to prevent vehicle speed from exceeding the value of HDC_set-speed. In the present embodiment the HDC system 12HD is not operable to apply positive drive torque. Rather, the HDC system 12HD is only operable to apply negative brake torque by means of the braking system 22.

A HDC system HMI 20HD is provided by means of which a user may control the HDC system 12HD, including setting the value of HDC_set-speed. An HDC system selector button 177 is provided on the steering wheel 171 by means of which a user may activate the HDC system 12HD to control vehicle speed.

As noted above, the HDC system 12HD is operable to allow a user to set a value of HDC set-speed parameter HDC_set-speed and to adjust the value of HDC_set-speed using the same controls as the cruise control system 16 and LSP control system 12. Thus, in the present embodiment, when the HDC system 12HD is controlling vehicle speed, the HDC system set-speed may be increased, decreased or set to an instant speed of the vehicle in a similar manner to the set-speed of the cruise control system 16 and LSP control system 12, using the same control buttons 173, 173R, 174, 175. The HDC system 12HD is operable to allow the value of HDC_set-speed to be set to any value in the range from 2-30 kph.

If the HDC system 12HD is selected when the vehicle 100 is travelling at a speed of 50 kph or less and no other speed control system is in operation, the HDC system 12HD sets the value of HDC_set-speed to a value selected from a look-up table. The value output by the look-up table is determined in dependence on the identity of the currently selected transmission gear, the currently selected PTU gear ratio (Hi/LO) and the currently selected driving mode. The HDC system 12HD then applies the powertrain 129 and/or braking system 22 to slow the vehicle 100 to the HDC system set-speed provided the driver does not override the HDC system 12HD by depressing the accelerator pedal 161. The HDC system 12HD is configured to slow the vehicle 100 to the set-speed value at a deceleration rate not exceeding a maximum allowable rate although as noted elsewhere the HDC system 12HD is not able to cause positive drive torque to be applied by the powertrain 129 in order to reduce a rate of deceleration of the vehicle 100. The rate is set at 1.25 ms-2 in the present embodiment, however other values are also useful. If the user subsequently presses the 'set-speed' button 173 the HDC system 12HD sets the value of HDC_set-speed to the instant vehicle speed provided the instant speed is 30 kph or less. If the HDC system 12HD is selected when the vehicle 100 is travelling at a speed exceeding 50 kph, the HDC system 12HD ignores the request and provides an indication to the user that the request has been ignored.

In the present embodiment the vehicle 100 is configured to assume one of a plurality of power modes PM at a given moment in time. In each power mode the vehicle 100 may be operable to allow a predetermined set of one or more operations to be performed. For example, the vehicle 100 may allow a predetermined one or more vehicle subsystems such as an infotainment system, a windscreen demist subsystem and a windscreen wiper control system to be activated only in a respective one or more predetermined power modes. In one or more of the power modes the vehicle 100 may be configured to inhibit one or more operations, such as turning on of the infotainment system.

The identity of the power mode in which the vehicle 100 is to operate at a given moment in time is transmitted to each controller 10, 11, 12, 13, 14, 16, 12HD, of the vehicle 100 by the central controller 10. The controllers respond by assuming a predetermined state associated with that power mode and that controller. In the present embodiment each controller may assume an ON state in which the controller is configured to execute computer program code associated with that controller, and an OFF state in which supply of power to the controller is terminated. In the present embodiment, the central controller 10 is also operable to assume a quiescent state. The quiescent state is assumed by the central controller 10 when the vehicle is in power mode PM0 and the controller 10 has confirmed that the other controllers 11, 12, 13, 14, 16, 12HD have successfully assumed the OFF state following receipt of the command to assume power mode PM0.

Figure 2:
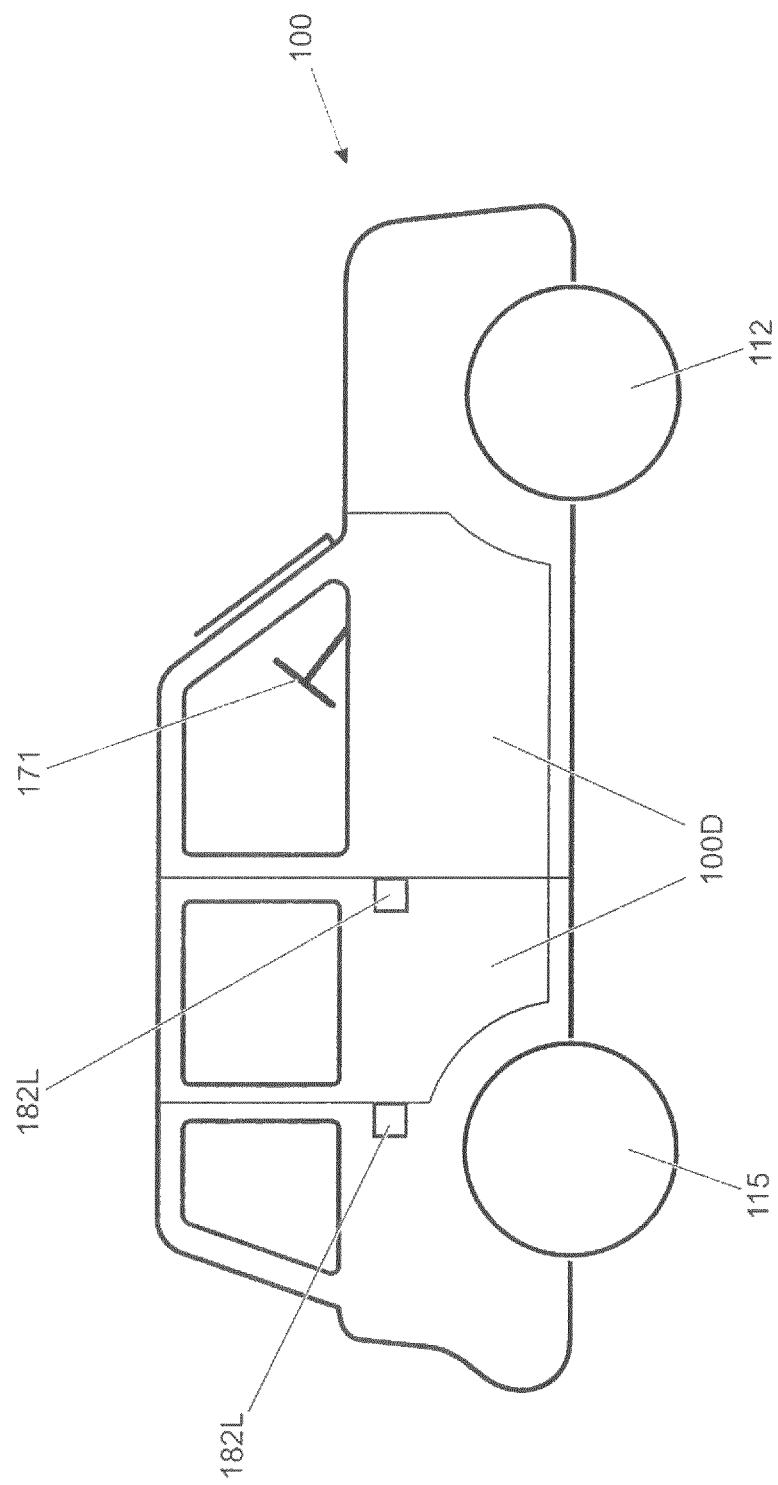
FIG. 2 shows the vehicle of FIG. 1 in side view.
Figure 6:
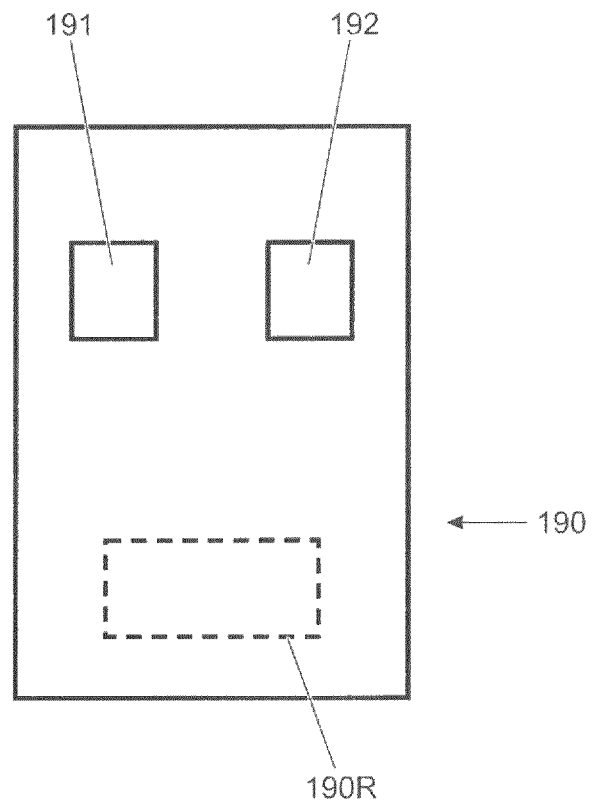
FIG. 6 is a schematic illustration of a known key fob for use with the vehicle of FIG. 1.

In the present embodiment the vehicle 100 is provided with a known key fob 190 (FIG. 6) that has a radio frequency identification device (RFID) 190R embedded therein. The key fob 190 has first and second control buttons 191, 192. The key fob 100 is configured to generate a respective electromagnetic signal in response to depression of the first or second control buttons 191, 192. The central controller 10 detects the electromagnetic signal by means of a receiver module forming part of the controller 10 and triggers locking or unlocking of door locks 182L of the vehicle 100. Each door 100D of the vehicle 100 is provided with a respective door lock 182L as shown in FIG. 2.

Pressing of the first control button 191 generates a door unlock signal, which triggers unlocking of the door locks 182L, whilst pressing of the second control button 192 triggers a door lock signal, which triggers locking of the door locks 182L.

When the controller 10 is in the quiescent state, consumption of power by the central controller 10 is reduced and the controller 10 monitors receipt of a door unlock signal from the key fob 190. It is to be understood that in some embodiments one or more vehicle controllers may be configured to remain in the ON or quiescent state, to allow one or more essential functions to be performed, when the vehicle is in power mode PM0. For example in vehicles fitted with an intruder alarm system an intruder alarm controller may be permitted to remain in the ON or a quiescent state pending detection of an intrusion. Upon detection of an intrusion the intruder alarm controller may cause the central controller 10 to assume the ON state if it is not already in that state.

The central controller 10 is also configured to transmit a radio frequency (RF) 'interrogation' signal that causes the RFID device 190R of the key fob 190 to generate an RF 'acknowledgement' signal in response to receipt of the interrogation signal. In the present embodiment the RFID device 190R is a passive device, not requiring battery power in order to generate the acknowledgement signal. The controller 10 is configured to detect the acknowledgment signal transmitted by the RFID device 190R provided the RFID device 190R is within range. By the term 'within range' is meant that the RFID device 190R or fob 190 is sufficiently close to the controller 10 to receive the interrogation signal and generate an acknowledgement signal that is detectable by the controller 10.

The vehicle 100 is also provided with a start/stop button 181. The start/stop button 181 is configured to transmit a signal to the central controller 10 when pressed in order to trigger an engine start operation, provided certain predetermined conditions are met. In response to pressing of the start/stop button 181 the central controller 10 causes the vehicle 100 to be placed in a condition in which if the transmission 124 is subsequently placed in the forward driving mode D or reverse driving mode R, the vehicle 100 may be driven by depressing accelerator pedal 161. In the present embodiment, the central controller 10 is configured to perform a pre-start verification operation before commanding the powertrain controller 11 to trigger an engine start operation. In performing the pre-start verification operation the controller 10 verifies (a) that the vehicle 100 is in a predetermined power mode as described in more detail below, (b) that the controller 10 is receiving an acknowledgement signal from the key fob 190 in response to transmission of the interrogation signal by the controller 10, and (c) that the transmission 124 is in either the park P or neutral N modes. Thus, the controller 10 requires that the RFID device 190R is within range of the controller 10 before permitting an engine start. If any of conditions (a) to (c) are not met the controller causes the vehicle 100 to remain in its current power mode.

It is to be understood that the central controller 10 is configured to cause the vehicle 100 to assume a predetermined one of a plurality of power modes in dependence at least in part on actuation of a control button 191, 192 of the key fob 190 and actuation of the start/stop button 181. In some embodiments the vehicle 100 may be configured such that the central controller 10 responds to voice commands from a user in addition to or instead of signals received from the key fob 190.

The various power modes in which the vehicle 100 of the embodiment of FIG. 1 may be operated will now be described. As noted above, the key fob 190 is operable to cause the door locks 182L of the vehicle 100 to be locked and unlocked. When the doors 100D of the vehicle 100 (FIG. 2) are closed and the locks 182L are in the locked condition, the vehicle 100 assumes power mode PM0.

If the first button 191 of the key fob 190 is subsequently actuated, the controller 10 causes the door locks 182L to assume the unlocked condition. Once the door locks 182L are in the unlocked condition and the controller 10 detects the acknowledgement signal from the key fob 190, the controller 10 causes the vehicle 100 to assume power mode PM4. In power mode PM4 the controller 10 permits a predetermined number of electrical systems to become active, including an infotainment system. Power mode PM4 may also be referred to as a convenience mode or accessory mode. If a user subsequently presses the second button 192 of the key fob 190, the controller 10 causes the vehicle 100 to revert to power mode PM0.

If, whilst the vehicle is in power mode PM4 a user presses the starter button 181 and maintains the button 181 in a depressed condition, the controller 10 performs the pre-start verification operation described above. Provided conditions (a) to (c) of the pre-start verification operation are met, the controller 10 places the vehicle 100 in power mode PM6.

When the vehicle 100 is in power mode PM6 the powertrain controller 11 is permitted to activate a starter device. In the present embodiment the starter device is a starter motor 121M. The powertrain controller 11 is then commanded to perform an engine start operation in which the engine 121 is cranked by means of the starter motor 121M to cause the engine 121 to start. Once the controller 10 determines that the engine 121 is running, the controller 10 places the vehicle 100 in power mode PM7.

In power mode PM6 the controller 10 disables certain non-critical electrical systems including the infotainment system. This is at least in part so as to reduce the magnitude of the electrical load on a battery 100B of the vehicle during cranking in order to permit an increase in the amount of electrical current available for engine starting. Isolation of non-critical electrical systems also reduces a risk of damage to the systems when a relatively large current drain is placed on the battery 100B by the starter motor 121M.

If whilst the vehicle is in power mode PM7, with the engine 121 running, a user again actuates the start/stop button 181, the controller 10 causes the powertrain controller 11 to switch off the engine 121 and the controller 10 causes the vehicle 100 to transition to power mode PM4. A user may then cause the vehicle to assume power mode PM0 by pressing the first button 191 of the key fob 190 provided each of the doors 100D is closed. It is to be understood that in some embodiments the user may trigger assumption of power mode PM0 whilst remaining in the vehicle 100 and locking the doors 181 by means of the key fob 190. In some embodiments the vehicle 100 may be configured to assume power mode PM0 regardless of whether the controller is receiving the acknowledgement signal from the key fob 190. Other arrangements are also useful.

It is to be understood that assumption of power mode PM0 by the vehicle 100 may be referred to as 'key off', whilst assumption of power mode PM4 from power mode PM0 may be referred to as 'key on'. A sequence of transitions of the vehicle from power mode PM0 to PM4, and back to power mode PM0, optionally including one or more transitions to power mode PM6 and power mode PM7 prior to assumption of power mode PM0, may be referred to as a 'key cycle'. Thus a key cycle begins and ends with the vehicle 100 in power mode PM0. In some embodiments, assumption of power mode PM6 or PM7 from power mode PM0 may be required in order to complete a key cycle, starting with power mode PM0.

It is to be understood that the VCU 10 is configured to implement a known Terrain Response (TR)® System of the kind described above in which the VCU 10 controls settings of one or more vehicle systems or sub-systems such as the powertrain controller 11 in dependence on a selected driving mode. The driving mode may be selected by a user by means of a driving mode selector 141S (FIG. 1). The driving modes may also be referred to as terrain modes, terrain response modes, or control modes. In the embodiment of FIG. 1 four driving modes are provided: an 'on-highway' driving mode suitable for driving on a relatively hard, smooth driving surface where a relatively high surface coefficient of friction exists between the driving surface and wheels of the vehicle; a 'sand' driving mode suitable for driving over sandy terrain; a 'grass, gravel or snow' driving mode suitable for driving over grass, gravel or snow, a 'rock crawl' driving mode suitable for driving slowly over a rocky surface; and a 'mud and ruts' driving mode suitable for driving in muddy, rutted terrain. Other driving modes may be provided in addition or instead.

In the present embodiment, at any given moment in time the LSP control system 12 is in one of a plurality of allowable 'on' modes (also referred to as conditions or states) selected from amongst an active or full function (FF) mode, a descent control (DC) mode, also referred to as an intermediate mode and a standby mode. The LSP control system may also assume an 'off' mode or condition. The active mode, DC mode and standby mode may be considered to be different 'on' modes or conditions of the vehicle, i.e. different modes in which the LSP control system is in an 'on' mode or condition as opposed to an 'off' mode or condition. In the off condition the LSP control system 12 only responds to pressing of the LSP selector button 172, which causes the LSP control system 12 to assume the on condition and the DC mode. When the LSP control system 12 assumes the on mode from the off mode in response to pressing of the LSP selector button, the value of LSP_set-speed is set to the instant speed of the vehicle 100 provided it is in the allowable range of speeds for operation of the LSP control system 12. If the vehicle speed 100 is above this range the value of LSP_set-speed is set to the highest allowable speed for operation of the LSP control system 12, i.e. 30 kph.

In the active or full function mode, the LSP control system 12 actively manages vehicle speed in accordance with the value of LSP set-speed, LSP_set-speed, by causing the application of positive powertrain drive torque to one or more driving wheels or negative braking system torque to one or more braked wheels.

In the DC mode the LSP control system 12 operates in a similar manner to that in which it operates when in the active mode except that the LSP control system 12 is prevented from commanding the application of positive drive torque by means of the powertrain 129. Rather, only braking torque may be applied, by means of the braking system 22 and/or powertrain 129. The LSP control system 12 is configured to increase or decrease the amount of brake torque applied to one or more wheels in order to cause the vehicle to maintain the LSP set-speed to the extent possible without application of positive drive torque. It is to be understood that, in the present embodiment, operation of the LSP control system 12 in the DC mode is very similar to operation of the HDC system 12HD, except that the LSP control system 12 continues to employ the LSP control system 12 set-speed value LSP_set-speed rather than the HDC control system set-speed value HDC_set-speed.

In the standby mode, the LSP control system 12 is unable to cause application of positive drive torque or negative brake torque to a wheel.

As noted above, in the 'off' mode the LSP control system 12 is not responsive to any LSP input controls except the LSP control system selector button 172. Pressing of the LSP control system selector button 172 when the system 12 is in the off mode causes the system 12 to assume the 'on' condition and the DC mode.

When the LSP control system 12 is initially switched on by means of the LSP selector button 172, the LSP control system 12 assumes the DC mode.

If whilst in DC mode the 'set +' button 174 is pressed, the LSP control system 12 sets the value of LSP_set-speed to the instant value of vehicle speed according to vehicle speed signal 36 (FIG. 4, discussed in more detail below) and assumes the active mode. If the vehicle speed is above 30 kph, being the maximum allowable value of LSP_set-speed, the LSP control system 12 remains in the DC mode and ignores the request to assume the active mode. A signal may be provided to the driver indicating that the LSP control system 12 cannot be activated due to the vehicle speed exceeding the maximum allowable value of LSP_set-speed. The signal may be provided by means of a text message provided on the LSP control HMI 18, by means of an indicator lamp, an audible alert or any other suitable means.

If the resume button 173R is depressed whilst in the DC mode, the LSP control system assumes the active mode and causes the vehicle to operate in accordance with the stored value of LSP_set-speed provided the vehicle speed does not exceed 30 kph.

If vehicle speed is above 30 kph but less than or substantially equal to 50 kph when the resume button 173R is pressed the LSP control system 12 remains in the DC mode until vehicle speed falls below 30 kph. In the DC mode, provided the driver does not depress the accelerator pedal 161 the LSP control system 12 deploys the braking system 22 to slow the vehicle 100 to a value of set-speed corresponding to the value of parameter LSP_set-speed. Once the vehicle speed falls to 30 kph or below, the LSP control system 12 assumes the active mode in which it is operable to cause a required amount of positive powertrain drive torque to be applied to one or more wheels via the powertrain 129, as well as negative torque via the powertrain 129 (via engine braking) and brake torque via the braking system 22 in order to control the vehicle in accordance with the LSP_set-speed value. The LSP control system 12 may generate a virtual accelerator pedal signal in order to cause the powertrain 129 to develop a required amount of powertrain torque in some embodiments. The virtual accelerator pedal signal may correspond to that which would be generated by an accelerator pedal controller in response to depression of the accelerator pedal 161 by an amount corresponding to the amount of powertrain torque required at a given moment in time. The accelerator pedal controller may form part of a powertrain controller 11 although other arrangements are also useful.

With the LSP control system 12 in the active mode, the user may increase or decrease the value of LSP_set-speed by means of the '+' and '−' buttons 174, 175. In addition, the user may optionally also increase or decrease the value of LSP_set-speed by lightly pressing the accelerator or brake pedals 161, 163 respectively. In some embodiments, with the LSP control system 12 in the active mode the '+' and '−' buttons 174, 175 may be disabled such that adjustment of the value of LSP_set-speed can only be made by means of the accelerator and brake pedals 161, 163. This latter feature may prevent unintentional changes in set-speed from occurring, for example due to accidental pressing of one of the '+' or '−' buttons 174, 175. Accidental pressing may occur for example when negotiating difficult terrain where relatively large and frequent changes in steering angle may be required. Other arrangements are also useful.

It is to be understood that in the present embodiment the LSP control system 12 is operable to cause the vehicle to travel in accordance with a value of set-speed in the range from 2-30 kph whilst the cruise control system is operable to cause the vehicle to travel in accordance with a value of set-speed in the range from 25-150 kph although other values are also useful, such as 30-120 kph or any other suitable range of values.

It is to be understood that if the LSP control system 12 is in the active mode, operation of the cruise control system 16 is inhibited. The two speed control systems 12, 16 therefore operate independently of one another, so that only one can be operable at any one time.

In some embodiments, the cruise control HMI 18 and the LSP control HMI 20 may be configured within the same hardware so that, for example, the speed selection is input via the same hardware, with one or more separate switches being provided to switch between the LSP control HMI 20 and the cruise control HMI 18.

When in the active mode, the LSP control system 12 is configured to command application of positive powertrain torque and negative brake torque, as required, by transmitting a request for (positive) drive torque in the form of a powertrain torque signal and/or a request for (negative) brake torque in the form of a brake torque signal to the brake controller 13. The brake controller 13 arbitrates any demand for positive powertrain torque, determining whether the request for positive powertrain torque is allowable. If a request for positive powertrain torque is allowable the brake controller 13 issues the request to the powertrain controller 11. In some embodiments, the request for brake torque may correspond to an amount of brake torque (or brake fluid pressure) to be developed by the braking system 22. In some alternative embodiments the request for brake torque may be for an amount of negative torque to be applied to one or more wheels. The brake controller 13 may in some embodiments determined whether the requested negative torque is to be supplied by means of powertrain braking alone, for example engine overrun braking, by means of powertrain braking and brake torque developed by the braking system 22, or by means of the braking system 22 alone. In some embodiments the brake controller 13 or LSP control system 12 may be configured to cause a required amount of net negative torque to be applied to one or more wheels by applying negative torque by means of the braking system 22 against positive drive torque generated by the powertrain 129. Application of positive drive torque generated by means of the powertrain 129 against negative brake torque generated by means of the braking system 22 may be made in order to reduce wheel flare when driving on surfaces of relatively low surface coefficient of friction such as during off-road driving. By wheel flare is meant excessive wheel slip as a result of the application of excess positive net torque to a wheel.

In the present embodiment the brake controller 13 also receives from the LSP control system 12 a signal S_mode indicative of the mode in which the LSP control system 12 is operating, i.e. whether the LSP control system 12 is operating in the active mode, DC mode, standby mode or off mode.

If the brake controller 13 receives a signal S_mode indicating that the LSP control system 12 is operating in the DC mode, standby mode or off mode, the brake controller 13 sets a powertrain torque request inhibit flag in a memory thereof. The powertrain torque request inhibit flag indicates that positive torque requests to the powertrain controller 11 from the brake controller 13 in response to positive torque requests from the LSP control system 12 are forbidden. Accordingly, if a request for positive powertrain torque is received by the brake controller 13 from the LSP control system 12 whilst the LSP control system 12 is operating in the DC mode, standby mode or off mode, the positive torque request is ignored by the brake controller 13.

In some embodiments, the powertrain controller 11 is also provided with signal S_mode indicating the mode in which the LSP control system 12 is operating. If the LSP control system 12 is operating in a mode other than the active mode, such as the DC mode, standby mode or off mode, positive powertrain torque requests received as a consequence of a command from the LSP control system 12 are ignored by the powertrain controller 11.

In some embodiments, if the powertrain controller 11 receives a request for positive powertrain torque from the brake controller 13 as a consequence of a command from the LSP control system 12 and the request is received more than a predetermined period after the LSP control system 12 has transitioned to a mode other than the active mode, the powertrain controller 11 causes the LSP control system 12 to assume a disabled off mode. In the disabled off mode the LSP control system 12 is effectively locked into the off condition or mode for the remainder of the current key cycle and the LSP control system 12 does not assume the DC mode in response to pressing of the LSP selector button 172. The predetermined period may be any suitable period such as 50 ms, 100 ms, 500 ms, 1000 ms or any other suitable period. The period may be set to a value such that any delay in receipt of a positive torque request issued by the LSP control system 12 immediately prior to a transition from the active mode to a mode other than the active mode (and in which positive torque requests are not permitted) that is consistent with normal system operation will not trigger a transition to the disabled off mode. However, the powertrain controller 11 is configured such that any request for positive powertrain torque received by the powertrain controller 11 as a consequence of a request issued by the LSP control system 12 after assuming a mode other than the active mode (and in which positive torque requests are not permitted) will trigger a transition to the disabled off mode.

It is to be understood that other arrangements may also be useful. For example, in some embodiments, in the disabled off mode the LSP control system 12 may be configured not to respond to the LSP selector button 172 by assuming the DC mode until after the vehicle has transitioned from power mode PM7 to power mode PM4. As described above, a transition from power mode PM7 to power mode PM4 may be accomplished by depressing the start/stop button 124S. When the vehicle 100 is subsequently restarted and assumes power mode PM7, the LSP control system 12 may be permitted to assume operation in the active mode as required.

It is to be understood that some vehicles may be provided with known automatic engine stop/start functionality. In vehicles with this functionality, the powertrain controller 11 is configured to command stopping and starting of the engine 121 according to a stop/start control methodology when the vehicle 100 is being held stationary by means of brake pedal 163 with the transmission in the drive mode D. The process of automatically commanding stopping and restarting of the engine 121 may be referred to as an automatic stop/start cycle. In vehicles having automatic engine stop/start functionality, the controller 10 may be configured to cause the vehicle 100 to assume a power mode PM6A when the engine 121 is stopped during a stop/start cycle. Power mode PM6A is similar to power mode 6, except that disabling of certain vehicle systems such as the infotainment system is not performed when in power mode PM6A. In power mode PM6A, the powertrain controller 11 is configured to restart the engine 121 upon receipt of a signal indicating a user has released the brake pedal 163. It is to be understood that in some embodiments, a vehicle 100 may be configured to require an engine restart before the LSP control system 12 may exit the DC fault mode but an engine restart as part of an automatic stop/start cycle may be configured not to qualify as an engine restart permitting the system 12 to exit the DC fault mode. In some embodiments therefore, a transition from power mode PM7 to power mode PM6A and back to power mode PM7 does not permit the LSP control system 12 to exit the disabled off mode.

In some embodiments the LSP control system 12 may be configured such that it can assume one of a number of different further modes such as:

(i) DC fault mode
(ii) DC fault mode fade-out mode
(iii) DC mode fade-out mode
(iv) Active standby mode
(v) DC standby mode The DC fault mode corresponds to the DC mode except that if the DC fault mode is assumed by the LSP control system 12, the LSP control system 12 is unable subsequently to assume the active mode for the remainder of the current key cycle. Thus, when the next key-on procedure is performed, following the next key-off procedure, the LSP control system 12 is permitted to assume the active mode when required. The vehicle 100 may be configured wherein the LSP control system 12 may assume the DC fault mode if a fault is detected indicating that the LSP control system 12 should not be permitted to request positive powertrain drive torque but where it is determined that it may be desirable for the benefits of DC mode to be enjoyed. Thus a transition from active mode to DC fault mode may be preferable to a transition to the off mode, particularly when negotiating off road conditions, in the event of a relatively minor fault in respect of the LSP control system 12.

In some embodiments, if a transition to DC fault mode occurs with more than a predetermined frequency, the LSP control system 12 may become latched in the DC fault mode until a reset procedure is performed requiring action other than a key-off and subsequent key-on procedure in order to permit the active mode to be assumed again. In some embodiments, the LSP control system 12 may require a predetermined code to be provided to it. In some embodiments, the LSP control system 12 may be configured to receive the code via a computing device external to the vehicle 100 that temporarily communicates with the LSP control system 12 in order to provide the code. The computing device may be a device maintained by a vehicle servicing organisation such as a dealer certified by a manufacturer of the vehicle 100. The computing device may be in the form of a laptop or other computing device, and be configured to communicate wirelessly with the LSP control system 12 or via a wired connection.

The predetermined frequency may be defined in terms of a predetermined number of occurrences in a predetermined number of key cycles, or a predetermined distance driven, or be time based such as a predetermined number of occurrences in a predetermined period in which the vehicle is in power mode 7 (or power mode 6A in addition to power mode 7, in the case of a vehicle with stop/start functionality) over one or more key cycles, or a predetermined number of occurrences in a given calendar period, such as a day, a week, a month or any other suitable frequency.

The DC fault mode fade-out mode is a mode assumed by the LSP control system 12 when transitioning from the DC fault mode to an off mode such as disabled off, unless an immediate ('binary') transition to an off mode is required in which case the DC fault mode fade-out mode is not assumed. Thus, under certain conditions, rather than abruptly terminate commanding application of brake torque by means of the braking system 22 when ceasing operation in the DC fault mode and transitioning to an off mode such as 'off' or 'disabled off', the LSP control system 12 gradually fades out the application of any brake torque applied by the braking system 22 as a consequence of being in the DC fault mode, before assuming the off or disabled off mode. This is at least in part so as to allow a driver time to adapt to driving without the system 12 applying brake torque automatically.

Similarly, if the LSP control system 12 transitions from the DC mode to a mode in which the LSP control system 12 is unable to command application of brake torque such as the standby mode, off mode or disabled off mode, the LSP control system 12 may assume the DC fade-out mode as an intermediate mode. In the DC fade-out mode, like the DC fault mode fade-out mode, the LSP control system 12 gradually reduces the amount of any brake torque commanded by the LSP control system 12, before assuming the target mode such as standby mode, off mode or disabled off mode.

The active standby mode is a mode assumed by the LSP control system 12 from the active mode if the driver over-rides the LSP control system 12 by depressing the accelerator pedal 161 to increase vehicle speed. If the driver subsequently releases the accelerator pedal with vehicle speed within the allowable range for the LSP control system 12 to operate in the active mode (i.e. a speed in the range 2-30 kph), the LSP control system 12 resumes operation in the active mode.

The DC standby mode is a mode assumed by the LSP control system 12 if whilst operating in the DC mode the driver over-rides the LSP control system 12 by depressing the accelerator pedal 161. If the driver subsequently releases the accelerator pedal, then when vehicle speed is within the allowable range for the LSP control system 12 to operate in the DC mode (i.e. a speed in the range 2-30 kph), the LSP control system 12 resumes operation in the DC mode. Other arrangements are also useful. In some embodiments the LSP control system 12 may be configured to assume DC mode from the DC standby mode and cause application of brake torque to slow the vehicle 100 when a driver releases the accelerator pedal 161 even at speeds above 30 kph. In some embodiments the LSP control system 12 may be configured to cause application of brake torque at speeds of up to 50 kph, 80 kph or any other suitable speed in order to cause vehicle speed to reduce to the LSP target speed LSP_setspeed. The LSP control system 12 may be configured to take into account negative torque applied by a powertrain due for example to engine over-run braking in determining an amount of brake torque required in order to cause a vehicle to slow at a desired rate. The LSP control system 12 may be configured to cause a vehicle to slow at a desired rate according to a predetermined deceleration profile.

In some embodiments, if the powertrain controller 11 receives a request for positive powertrain torque from the brake controller 13 as a consequence of a command from the LSP control system 12 and the LSP control system 12 is in the DC mode, the powertrain controller 11 causes the LSP control system 12 to assume the DC fault mode if the positive torque request is received more than a predetermined period after the LSP control system 12 has transitioned to the DC mode. As noted above, in the DC fault mode the LSP control system 12 is permitted to cause application of brake torque by the braking system 22 to control vehicle speed but is prevented from assuming the active or FF mode for the remainder of the current key cycle. In these circumstances, the LSP control system 12 assumes the DC fault mode substantially immediately with no requirement to blend the transition between the DC mode and DC fault mode.

As noted above, the predetermined period may be any suitable period such as 50 ms, 100 ms, 500 ms, 1000 ms or any other suitable period. The period may be set to a value such that any inherent system delay in receipt by the powertrain controller 11 of a torque request from the brake controller 13 as a consequence of a request issued by the LSP control system 12 prior to a transition from the active mode to the DC mode will not trigger a transition to the DC fault mode. It is to be understood that by inherent system delay is meant a delay in signal receipt that occurs during normal operation, for example due to a requirement to synchronise timing signals, or to transmit commands from the LSP control system 12 to the powertrain controller 11 at predetermined intervals as part of an inter-controller communications protocol.

In some embodiments, if the powertrain controller 11 receives a request for positive powertrain torque from the brake controller 13 as a consequence of a command from the LSP control system 12 and the LSP control system 12 is in the DC fault mode or DC fault mode fade out mode only, the powertrain controller 11 causes the LSP control system 12 to assume the disabled off mode if the positive torque request is received more than a predetermined period after the LSP control system 12 has transitioned to the DC fault mode or DC fault mode fade out mode. In the present embodiment the predetermined period is a period of 500 ms. However the predetermined period may be any suitable period such as 50 ms, 100 ms, 1000 ms or any other suitable period. The LSP control system 12 may be configured substantially abruptly to terminate application of any negative (brake) torque requested by the LSP control system 12 when the transition to the disabled off mode is commanded even if the system 12 is in the processes of fading out any negative brake torque that is being applied as a result of a request issued by the LSP control system 12

In some embodiments, in addition or instead, if the powertrain controller 11 receives a request for positive powertrain torque from the brake controller 13 as a consequence of a command from the LSP control system 12 and the signal S_mode indicates that the LSP control system 12 is in the DC mode, DC standby mode, DC mode fade-out mode or active standby mode, the powertrain controller 11 causes the LSP control system 12 to assume the disabled off mode if the positive torque request is received over a sustained period of more than a predetermined period. In the present embodiment the predetermined period is substantially 500 ms. However the predetermined period may be any suitable period such as 100 ms, 1000 ms or any other suitable period. The LSP control system 12 is configured gradually to cause fade-out of any negative (brake) torque being applied as a consequence of a command from the LSP control system 12 when the transition to the disabled off mode is commanded. The fade-out of brake torque may be accomplished by assuming the DC mode fade-out mode or DC fault mode fade-out mode if they have not already been assumed.

In some embodiments, the LSP control system 12 is caused to assume the disabled off mode if the powertrain controller 11 receives a request for positive powertrain torque from the brake controller 13 as a consequence of a command from the LSP control system 12 and signal S_mode indicates that the LSP control system 12 is in the DC fault mode or DC fault mode fade-out mode, as well as when the signal indicates the LSP control system 12 is in the DC mode, DC standby mode, DC mode fade-out mode or active standby mode.

It is to be understood that in some embodiments, instead of gradually fading out negative brake torque, the LSP control system 12 may be configured to abruptly terminate application of any negative brake torque as a consequence of a command by the LSP control system 12. Thus, if a request for positive powertrain torque is received over a sustained period of more than the predetermined period when the LSP control system 12 is in the DC mode, DC standby mode, DC fault mode, DC mode fade-out mode, DC fault mode fade-out mode or active standby mode the system may abruptly terminate application of brake torque caused by the LSP control system 12. It is to be understood that the braking system 12 continues to respond to driver brake commands via the brake pedal 163.

It is to be understood that in the present embodiment if a driver switches off the LSP control system 12 manually, the LSP control system 12 is configured gradually to cause fade-out of any negative (brake) torque being applied as a consequence of a command from the LSP control system 12. This feature has the advantage that vehicle composure may be enhanced.

Figure 4:
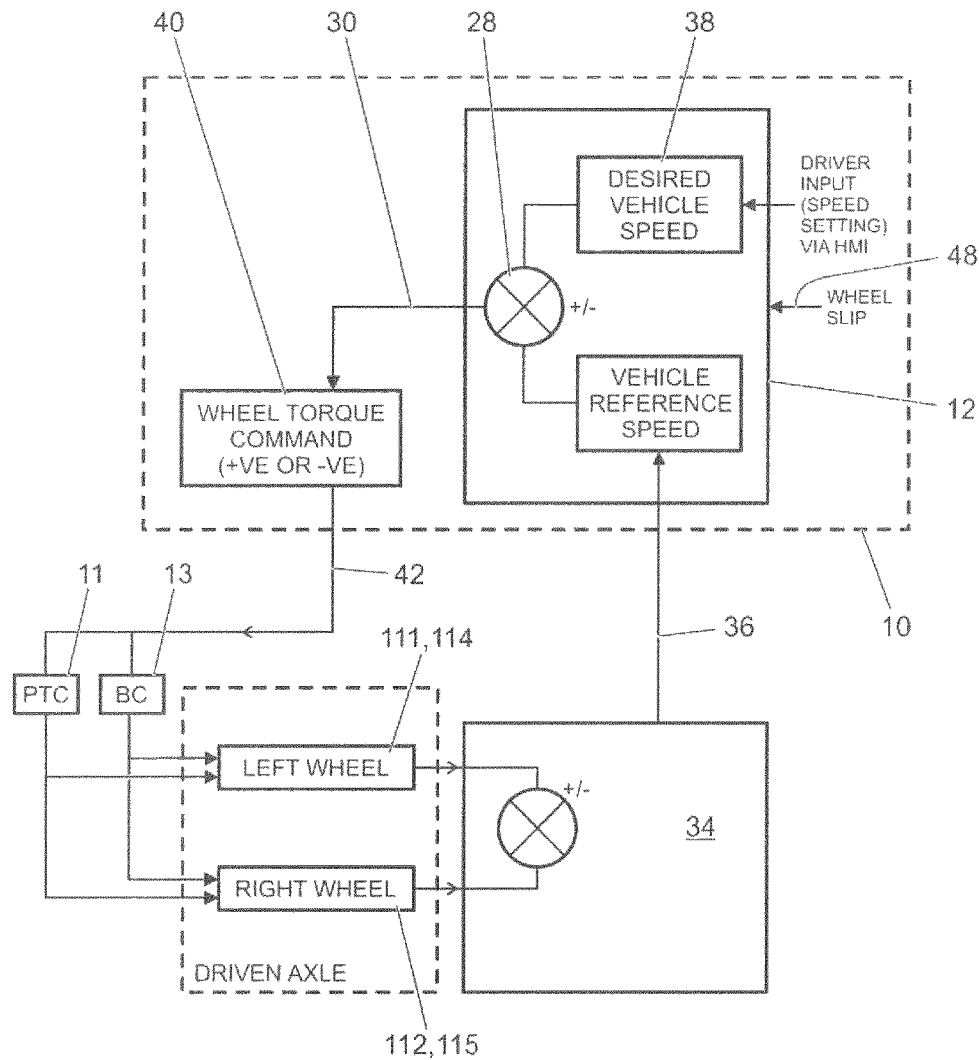
FIG. 4 is a schematic diagram of further features of the vehicle speed control system in FIG. 3.

FIG. 4 illustrates the means by which vehicle speed is controlled in the LSP control system 12. As described above, a speed selected by a user (set-speed) is input to the LSP control system 12 via the LSP control HMI 20. A vehicle speed calculator 34 provides a vehicle speed signal 36 indicative of vehicle speed to the LSP control system 12. The speed calculator 34 determines vehicle speed based on wheel speed signals provided by wheel speed sensors 111S, 112S, 114S, 115S. The LSP control system 12 includes a comparator 28 which compares the LSP control system set-speed LSP_set-speed 38 (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed LSP_set-speed. An increase in torque is generally accomplished by increasing the amount of powertrain torque delivered to a given position of the powertrain, for example an engine output shaft, a wheel or any other suitable location. A decrease in torque at a given wheel to a value that is less positive or more negative may be accomplished by decreasing the amount of any positive powertrain torque delivered to a wheel, by increasing the amount of any negative powertrain torque delivered to a wheel, for example by reducing an amount of air and/or fuel supplied to an engine 121, and/or by increasing a braking force on a wheel. It is to be understood that in some embodiments in which a powertrain 129 has one or more electric machines operable as a generator, negative torque may be applied by the powertrain 129 to one or more wheels by means of the electric machine. As noted above negative torque may also be applied by means of engine braking in some circumstances, depending at least in part on the speed at which the vehicle 100 is moving. If one or more electric machines are provided that are operable as propulsion motors, positive drive torque may be applied by means of the one or more electric machines.

An output 42 from the evaluator unit 40 is provided to the brake controller 13. The brake controller 13 in turn controls a net torque applied to the vehicle wheels 111-115 by commanding application of brake torque via the brakes 111B, 112B, 114B, 115B and/or positive drive torque by commanding powertrain controller 11 to deliver a required amount of powertrain torque. The net torque may be increased or decreased depending on whether the evaluator unit 40 demands positive or negative torque. In order to cause application of the necessary positive or negative torque to the wheels, the brake controller 13 may command that positive or negative torque is applied to the vehicle wheels by the powertrain 129 and/or that a braking force is applied to the vehicle wheels by the braking system 22, either or both of which may be used to implement the change in torque that is necessary to attain and maintain a required vehicle speed. In the illustrated embodiment the torque is applied to the vehicle wheels individually so as to maintain the vehicle 100 at the required speed, but in another embodiment torque may be applied to the wheels collectively to maintain the required speed. In some embodiments, the powertrain controller 11 may be operable to control an amount of torque applied to one or more wheels at least in part by controlling a driveline component such as a rear drive unit, front drive unit, differential or any other suitable component. For example, one or more components of the driveline 130 may include one or more clutches operable to allow an amount of torque applied to wheels of a given axle to be controlled independently of the torque applied to wheels of another axle, and/or the amount of torque applied to one or more individual wheels to be controlled independently of other wheels. Other arrangements are also useful.

Where a powertrain 129 includes one or more electric machines, for example one or more propulsion motors and/or generators, the powertrain controller 11 may be operable to modulate or control the amount of torque applied to one or more wheels at least in part by means of the one or more electric machines.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation of the on-highway cruise control system 16 so that automatic control of vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the value of LSP_set-speed, and continues to control automatically the torque applied to the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle 100 must be resumed, or speed control by the cruise control system 12 resumed by pressing the resume button 173R or set-speed button 173.

In a further embodiment of the present invention (not shown) a wheel slip signal 48 is derived not just from a comparison of wheel speeds, but further refined using sensor data indicative of the vehicle's speed over ground. Such a speed over ground determination may be made via global positioning (GPS) data, or via a vehicle mounted radar or laser based system arranged to determine the relative movement of the vehicle 100 and the ground over which it is travelling. A camera system may be employed for determining speed over ground in some embodiments.

At any stage of the LSP control process the user can override the LSP function by depressing the accelerator pedal 161 and/or brake pedal 163 to adjust the vehicle speed in a positive or negative sense. However, absent any override by a user, in the event that a wheel slip event is detected via signal 48, the LSP control system 12 remains active and control of vehicle speed by the LSP control system 12 is not terminated. As shown in FIG. 4, this may be implemented by providing a wheel slip event signal 48 to the LSP control system 12 which is then managed by the LSP control system 12 and/or brake controller 13. In the embodiment shown in FIG. 1 the SCS 14S generates the wheel slip event signal 48 and supplies it to the LSP control system 12 and cruise control system 16.

A wheel slip event is triggered when a loss of traction occurs at any one of the vehicle wheels. Wheels and tyres may be more prone to losing traction when travelling for example on snow, ice, mud or sand and/or on steep gradients or cross-slopes. A vehicle 100 may also be more prone to losing traction in environments where the terrain is more uneven or slippery compared with driving on a highway in normal on-road conditions. Embodiments of the present invention therefore find particular benefit when the vehicle 100 is being driven in an off-road environment, or in conditions in which wheel slip may commonly occur. Manual operation in such conditions can be a difficult and often stressful experience for the driver and may result in an uncomfortable ride.

The vehicle 100 is also provided with additional sensors (not shown) which are representative of a variety of different parameters associated with vehicle motion and status. The signals from the sensors provide, or are used to calculate, a plurality of driving condition indicators (also referred to as terrain indicators) which are indicative of the nature of the terrain conditions over which the vehicle is travelling. Suitable sensor data may be provided by inertial systems unique to the LSP or HDC control system 12, 12HD or systems that form part of another vehicle sub-system such as an occupant restraint system or any other sub-system which may provide data from sensors such as gyros and/or accelerometers that may be indicative of vehicle body movement and may provide a useful input to the LSP and/or HDC control systems 12, 12HD.

The sensors on the vehicle 100 include sensors which provide continuous sensor outputs to the VCU 10, including wheel speed sensors, as mentioned previously and as shown in FIG. 1, and other sensors (not shown) such as an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the SCS 14S, a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used. Other sensors may be useful in addition or instead in some embodiments.

The VCU 10 also receives a signal from the steering controller 170C. The steering controller 170C is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes (driving modes) for the vehicle subsystems is appropriate, with each control mode corresponding to a particular terrain type over which the vehicle is travelling (for example, mud and ruts, sand, grass/gravel/snow).

If the user has selected operation of the vehicle in an automatic driving mode selection condition, the VCU 10 then selects the most appropriate one of the control modes and is configured automatically to control the subsystems according to the selected mode. This aspect of the invention is described in further detail in our co-pending patent application nos. GB2492748, GB2492655 and GB2499252, the contents of each of which is incorporated herein by reference.

The nature of the terrain over which the vehicle is travelling (as determined by reference to the selected control mode) may also be utilised in the LSP control system 12 to determine an appropriate increase or decrease in vehicle speed. For example, if the user selects a value of LSP_set-speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed, a visual indication of the speed constraint is provided to the user via the LSP HMI 20 to indicate that an alternative speed has been adopted.

Figure 7:
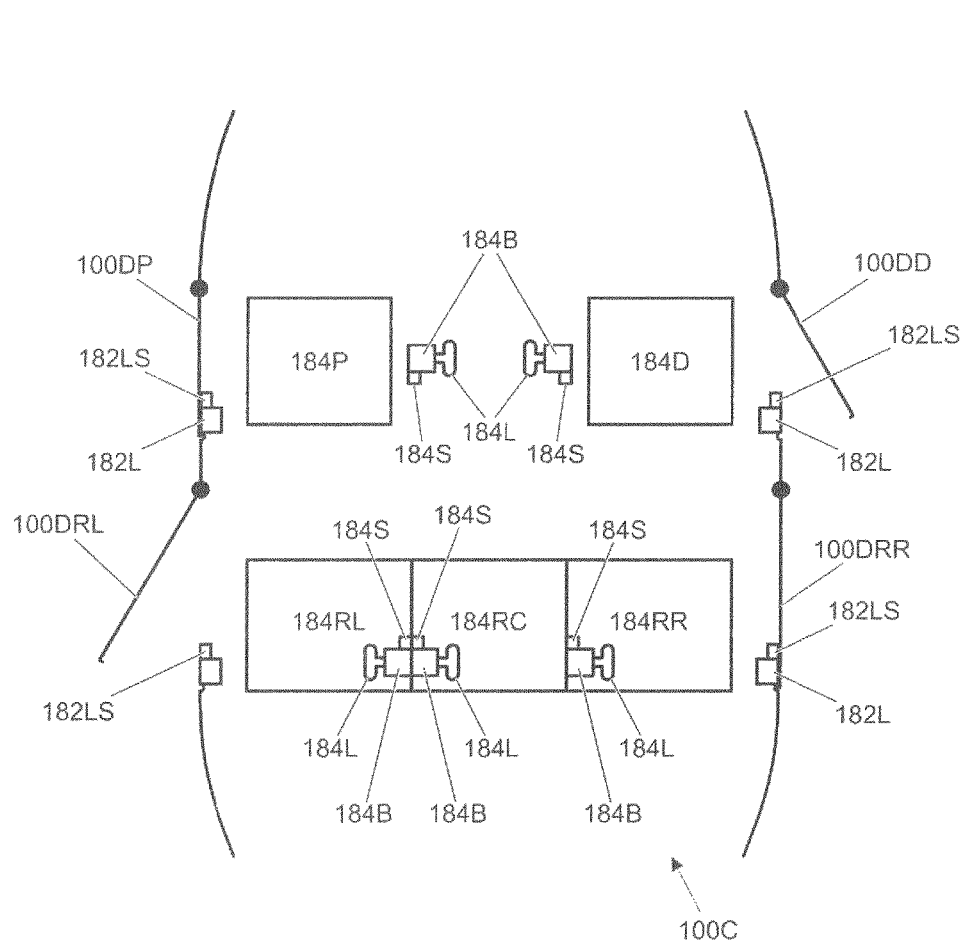
FIG. 7 is a schematic illustration of a cabin of the vehicle of FIG. 1.

FIG. 7 shows a plan view of a cabin 100C of the vehicle 100 of FIG. 1. The vehicle 100 has five seats: a driver seat 184D, a front passenger seat 184P, a rear left seat 184RL, a rear centre seat 184RC and a rear right seat 184RR. Each seat has a seat belt buckle 184B configured to receive a latch plate 184L of a seat belt associated with the seat. Each seat belt buckle 184B is provided with an electric switch 184S that is configured to complete an electrical circuit when the latch plate 184L is connected to the seat belt buckle 184B. The switch 184S is connected in an electrical circuit that permits the VCU 10 to receive an indication as to which of the seats of the vehicle 100 is occupied.

Figure 8:
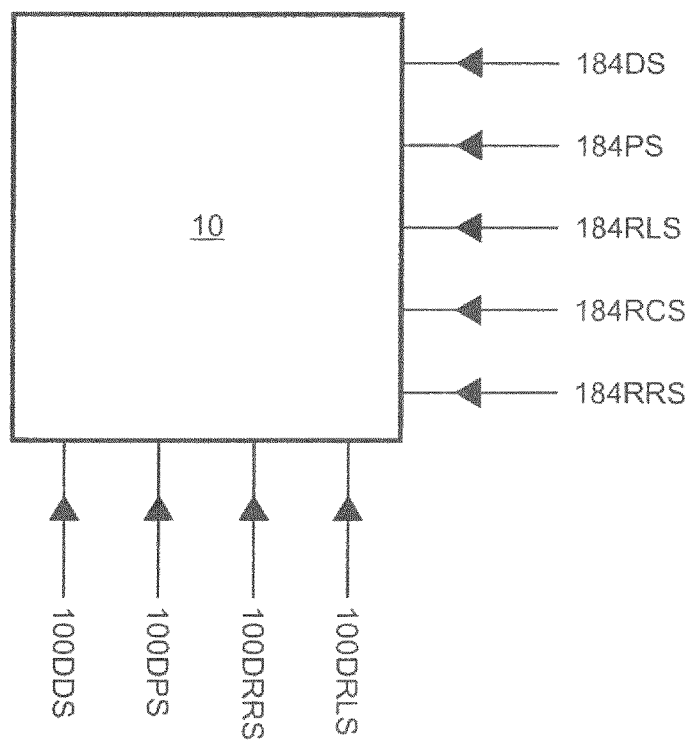
FIG. 8 shows a portion of a controller of the vehicle of FIG. 1.

As shown in FIG. 8, the VCU 10 has five input signal lines 184DS, 184PS, 184RLS, 184RCS and 184RRS that respectively provide an indication as to the state of the front driver seat buckle 184B, front passenger seat buckle 184B, rear left passenger seat buckle 184B, rear centre passenger seat buckle 184B and rear right passenger seat buckle 184B. The input signal lines 184DS, 184PS, 184RLS, 184RCS and 184RRS will be referred to as seat occupancy state signal lines. When a given seat belt buckle 184B of the vehicle 100 has a corresponding seat belt latch plate 184L connected to it, indicating that the seat belt is fastened and therefore that the corresponding seat is occupied, the corresponding seat occupancy state signal line is set high, otherwise the seat occupancy state signal line is set low.

As noted above the vehicle has four doors 100D. In the present embodiment, the VCU 10 is also configured to receive a door state signal indicative of whether each of the doors 100D is in a closed position, being the position of each door 100D when the vehicle is normally driven, or an open position, being the position of each door allowing a person to step into and out from the vehicle 100. The signal is generated by means of door state switches 182LS. As shown in FIG. 7 the vehicle 100 has four doors: a front right driver door 100DD, a front left passenger door 100DP, a rear left passenger door 100DRL and a rear right passenger door 100DRR. The front right driver door 100DD and rear left passenger door 100DRL are shown in an open position in FIG. 7 whilst the front left passenger door 100DP and rear right passenger door 100DRR are shown in a closed position.

When a door 100D is in a closed position, the corresponding door state switch 182LS assumes a closed condition, closing an electrical circuit, whilst when a door 100D is in an open position the corresponding door state switch 182LS assumes an open condition, opening the electrical circuit. The VCU 10 is able to determine the condition of each of the door state switches by reference to the state of each of four door state signal lines 100DDS, 110DPS, 100DRRS, 100DRLS indicative whether the electrical circuits in which the switches 182LS are connected are open or closed. The door state signal lines 100DDS, 110DPS, 100DRRS, 100DRLS provide an indication of the state of the door switches 182LS associated with the front right driver door 100DD, front left passenger door 100DP, rear left passenger door 100DRL and rear right passenger door 100DRR, respectively.

The VCU 10 is configured to monitor the door state signal lines 100DDS, 110DPS, 100DRRS, 100DRLS and seat occupancy state signal lines 184DS, 184PS, 184RLS, 184RCS, 184RRS.

If the LSP control system 12 is in the off mode and a user depresses the LSP control system selector button 172 (which may also be referred to as a 'master on' button 172), the VCU 10 checks the state of the driver seat occupancy state signal line 184DS and door state signal lines 100DDS, 110DPS, 100DRRS, 100DRLS. The VCU 10 only permits the LSP control system 12 to assume the DC mode if seat occupancy state signal line 184DS is high, indicating that the driver seat 184D is occupied, and each of the door state signal lines 100DDS, 110DPS, 100DRRS, 100DRLS is also high, indicating that each door 100D of the vehicle 100 is in the closed position. If these conditions are not met, the LSP control system 12 is not permitted to assume the DC mode. In some embodiments, if the LSP control system 12 is not permitted to assume the DC mode due to the state of the driver seat occupancy state signal line 184DS or door state signal lines 100DDS, 110DPS, 100DRRS, 100DRLS, a warning message is provided to a user by means of the LSP HMI 20 to inform the driver that the LSP control system 12 is unavailable due to a failure to fasten the driver seat belt, or because one of the doors 100D of the vehicle 100 is open.

The VCU 10 also monitors the state of the driver seat occupancy state signal line 184DS and door state signal lines 100DDS, 110DPS, 100DRRS, 100DRLS at all times whilst the LSP control system is turned on. If whilst the LSP control system 12 is in the DC mode the driver selects the active mode, by depressing the resume button 173R or 'set +' button 174, the VCU 10 again checks that seat occupancy state signal line 184DS is high, indicating that the driver seat 184D is occupied, and each of the door state signal lines 100DDS, 110DPS, 100DRRS, 100DRLS is also high, indicating that each door 100D of the vehicle 100 is in the closed position. If these conditions are met, the LSP control system 12 is permitted to assume the active mode. If any one of these conditions is not met, the LSP control system 12 is not permitted to assume the active mode.

If whilst the LSP control system 12 is in the active mode the VCU 10 determines that the driver seat occupancy state signal line 184DS is no longer high, or that any of the door state signal lines 100DDS, 110DPS, 100DRRS, 100DRLS are no longer high, the VCU 10 causes the LSP control system 12 to transition to the DC mode. The LSP control system 12 is then prevented from assuming the active mode until the conditions are met that the driver seat occupancy state signal line 184DS is high and that each of the door state signal lines 100DDS, 110DPS, 100DRRS, 100DRLS is also high. If a transition is made to the DC mode from the active mode for this reason, the LSP control system 12 is configured gradually to reduce the amount of torque that the LSP control system 12 causes a powertrain to develop, according to a predetermined function, rather than abruptly terminating the application of powertrain torque. This allows a driver more time to adapt their driving style to the new configuration of the vehicle 100 in which torque is no longer applied automatically.

Figure 9:
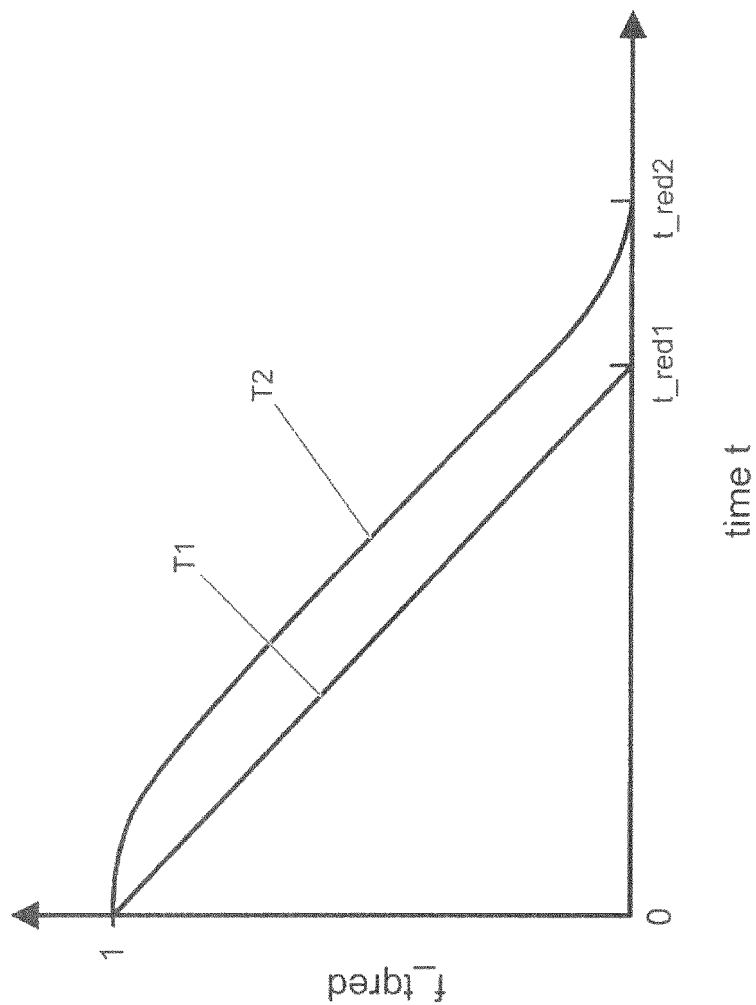
FIG. 9 is a flowchart illustrating operation of a vehicle according to an embodiment of the present invention.

FIG. 9 shows an example of two alternative predetermined functions that may be used to determine the manner in which torque being applied by the LSP control system 12 may be reduced as a function of time when a transition from the active mode to another mode is required in which torque is gradually reduced rather than abruptly reduced. FIG. 9 shows values of a torque reduction factor f_tq_red as function of time for two different predetermined functions shown by traces T1 and T2. In each case, the value of f_tq_red decreases from a value of 1 to a value of 0 over a predetermined torque reduction time period t_red1 or t_red2.

When it is required to fade out (or 'blend out') the application of positive powertrain torque by the LSP control system 12 in a transition from the active mode to the DC mode, the LSP control system multiplies the amount of powertrain torque the LSP control system 12 is requesting when the transition to the DC mode is initiated by the value of torque reduction factor f_tq_red at time t=0 (FIG. 9). The LSP control system 12 continues to multiply this value of powertrain torque by the factor f_tq_red as a function of time as shown schematically in FIG. 9 until time t_red1 or t_red2, depending on whether trace T1 or trace T2 is being employed.

In the case of trace T1, the torque reduction factor f_tq_red decreases substantially linearly with time according to a linear ramp function. In the case of trace T2, the torque reduction factor f_tq_red decreases according to an S-curve with a smooth transition to and from a rate of decrease of torque that is similar to that of trace T1.

It is to be understood that, in some alternative embodiments, the VCU 10 may be configured only to check the state of the driver door state signal line 100DDS rather than the door state signal line of each door 100D of the vehicle, in addition to the driver seat occupancy state signal line 184DS, when determining whether to permit the LSP control system to (a) transition from the off mode to the DC mode, (b) transition from the DC mode to the active mode, or (c) to remain in the active mode once the active mode has been assumed. Accordingly, in some embodiments the VCU 10 may be configured to permit the LSP control system 12 to transition from the off mode to the DC mode or from the DC mode to the active mode if the driver seat occupancy state signal line 184DS is high, indicating that the driver seat 184D is occupied, and the driver door state signal line 100DDS is high, indicating that the driver door 100DD is closed.

Figure 10:
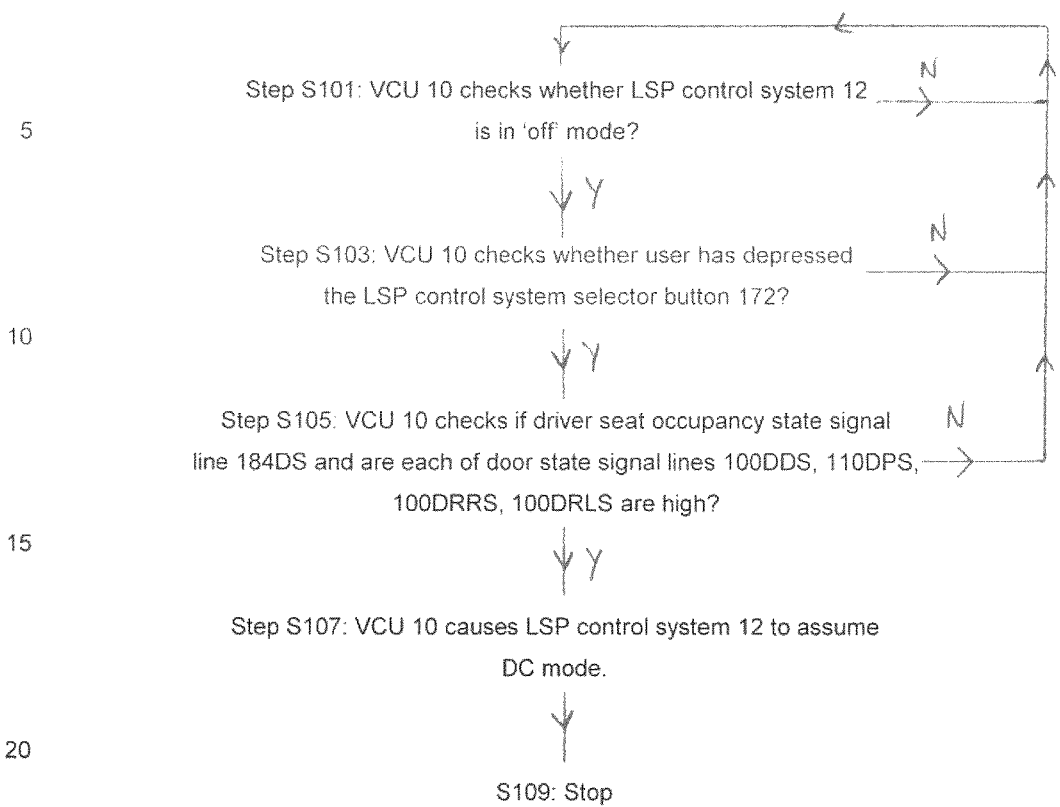
FIG. 10 illustrates a method according to an embodiment of the present invention.

FIG. 10 illustrates a method according to an embodiment of the invention.

At step S101 the VCU 10 determines whether the LSP control system 12 is in the 'off' mode. If the LSP control system 12 is in the off mode the VCU 10 continues at step S103 else the VCU 10 repeats step S101.

At step S103 the VCU checks whether the LSP control system selector button 172 has been pressed by a user. If the button 172 has been pressed the VCU 10 continues at step S105 else the VCU continues at step S101.

At step S105 the VCU 10 checks the state of the driver seat occupancy state signal line 184DS and door state signal lines 100DDS, 110DPS, 100DRRS, 100DRLS. If each of the signal lines is high, indicating the driver seat is occupied and each of the doors 100D is closed, the VCU 10 continues at step S107 else the VCU continues at step S101.

At step S107 the VCU causes the LSP control system 12 to assume the DC mode. The method terminates at step S109.

Figure 11:
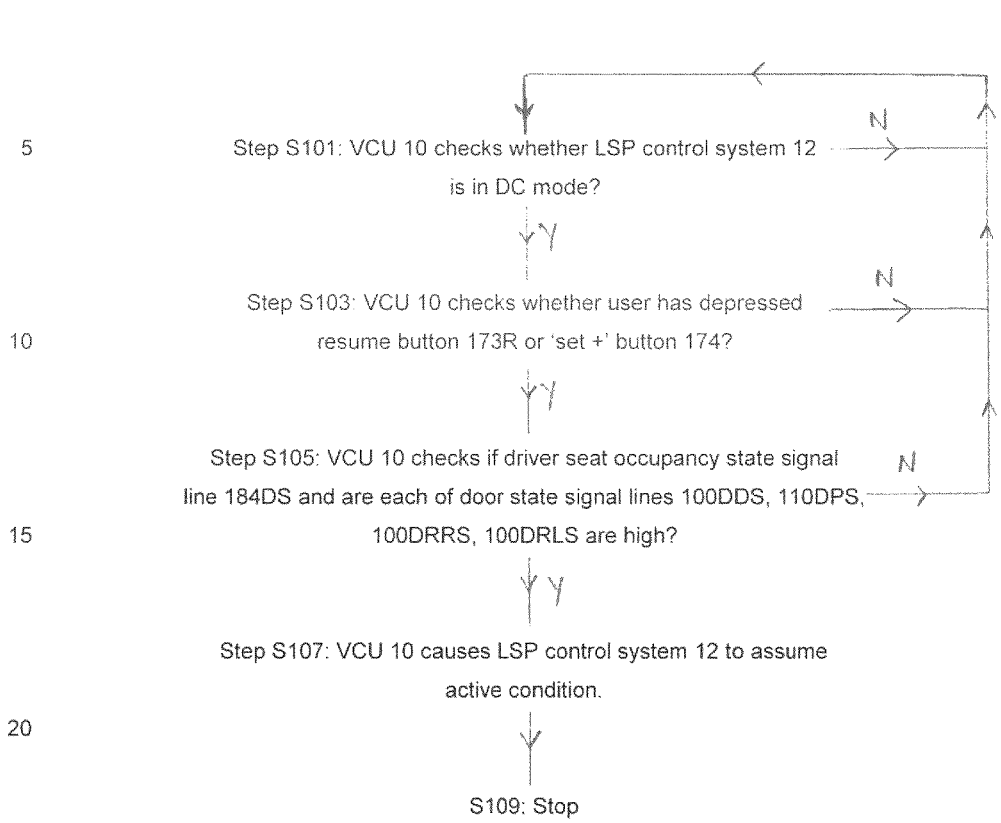
FIG. 11 illustrates a further method according to an embodiment of the present invention.

FIG. 11 illustrates a method according to a further embodiment of the invention.

At step S101 the VCU 10 determines whether the LSP control system 12 is in the DC mode. If the LSP control system 12 is in the DC mode the VCU 10 continues at step S103 else the VCU 10 repeats step S101.

At step S103 the VCU checks whether a user has depressed the resume button 173R or 'set +' button 174. If one of the buttons 173R, 174 has been pressed the VCU 10 continues at step S105 else the VCU continues at step S101.

At step S105 the VCU 10 checks the state of the driver seat occupancy state signal line 184DS and door state signal lines 100DDS, 110DPS, 100DRRS, 100DRLS. If each of the signal lines is high, indicating the driver seat is occupied and each of the doors 100D is closed, the VCU 10 continues at step S107 else the VCU continues at step S101.

At step S107 the VCU causes the LSP control system 12 to assume the active condition. The method terminates at step S109.

Figure 12:
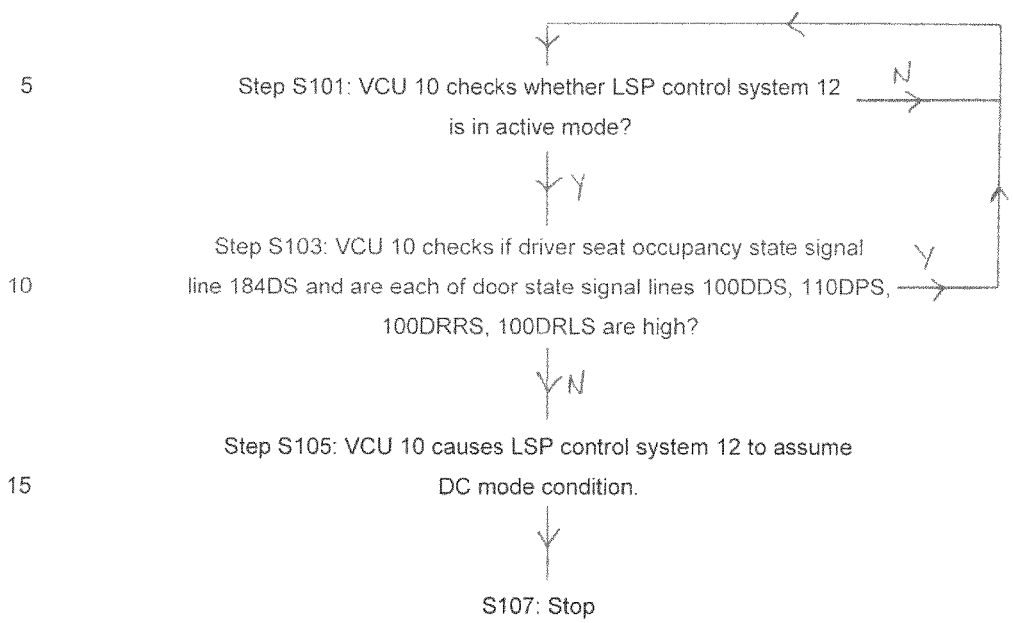
FIG. 12 illustrates a method according to an embodiment of the present invention.

FIG. 12 illustrates a method according to a further embodiment of the invention.

At step S101 the VCU 10 determines whether the LSP control system 12 is in the active mode. If the LSP control system 12 is in the active mode the VCU 10 continues at step S103 else the VCU 10 repeats step S101.

At step S103 the VCU 10 checks the state of the driver seat occupancy state signal line 184DS and door state signal lines 100DDS, 110DPS, 100DRRS, 100DRLS. If each of the signals is high, indicating the driver seat is occupied and each of the doors 100D is closed, the VCU 10 continues at step S101 else the VCU continues at step S105.

At step S105 the VCU causes the LSP control system 12 to assume the DC mode. The method terminates at step S109.

Some embodiments of the present invention have the feature that a speed control system cannot be caused to assume the active mode or remain in the active mode, being a mode in which the speed control system can cause a powertrain to develop positive drive torque, unless a driver is present in a driver seat and a door of a vehicle is closed, optionally all doors of the vehicle to be applied to one or Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system comprising:
a first controller operable to assume one of a plurality of respective states, in a first state the first controller being configured automatically to cause a powertrain to develop drive torque and cause a vehicle to operate in accordance with a target speed value,
the first controller being configured to receive
a door state indicator signal indicative of whether a door is in an open or closed state, and
an occupant presence indicator signal indicative of whether an occupant is present in a given seat of a vehicle,
the system being configured not to permit operation of the first controller in the first state in dependence on the door state indicator signal and the occupant presence indicator signal;
wherein the system is further operational in a second state in which the controller is operable automatically to cause application of a brake to one or more wheels thereby to prevent the vehicle from exceeding the target speed value and in which the first controller is not permitted automatically to cause a powertrain to develop drive torque; and
wherein when the first controller is in the first state and the controller determines that the door state indicator signal indicates the door is not in the closed state or that the occupant presence indicator signal indicates an occupant is not present, the first controller assumes operation in the second state.

2. A system according to claim 1 configured wherein when the door indicator signal indicates the door is not in the closed state and the occupant presence indicator signal indicates an occupant is not present, the system is configured not to permit operation of the first controller in the first state.

3. A system according to claim 1 wherein the first controller is further configured automatically to cause application of a brake to one or more wheels when in the first state.

4. A system according to claim 1 wherein the first controller is further operable in a second state in which the first controller is not permitted automatically to cause a powertrain to develop drive torque.

5. A system according to claim 4 wherein the first controller is further configured in the second state automatically to cause application of a brake to one or more wheels in order to cause a vehicle to operate in accordance with the target speed value.

6. A system according to claim 1 configured wherein when the first controller is in the first state and the controller determines that door state indicator signal indicates the door is not in the closed state or that the occupant presence indicator signal indicates an occupant is not present, the first controller assumes operation in a predetermined state other than the first state wherein the predetermined state is a state in which the first controller is not permitted to generate the first controller powertrain signal to cause a powertrain to develop positive drive torque.

7. A system according to claim 6 configured to cause a gradual reduction in the amount of any drive torque applied by a powertrain in response to the first controller powertrain signal when a transition from the first state to the predetermined state is made in response to the door indicator signal and occupant presence indicator signal.

8. A system according to claim 7 configured to cause a gradual reduction in the amount of any drive torque applied according to a ramp function, and wherein the ramp function comprises at least one selected from amongst a substantially linear ramp function and a substantially non-linear ramp function.

9. A system according to claim 4 wherein when the first controller is in the second state the system is configured to prevent the first controller from assuming the first state when the door indicator signal indicates the door is not in the closed state or the occupant presence indicator signal indicates an occupant is present.

10. A system according to claim 1 wherein the first controller is further configured to assume an off state in which the first controller does not cause said vehicle to operate in accordance with a target speed value.

11. A system according to claim 10 configured wherein when the first controller is in the off state the first controller is not permitted to assume a state other than the off state in response to a user request to assume a state other than the off state in dependence on the door state indicator signal and the occupant presence indicator signal.

12. A system according claim 1 wherein the occupant presence indicator signal is indicative of whether an occupant is present in a driver seat of a vehicle.

13. A system according to claim 1 wherein the occupant presence indicator signal is signal indicative of whether an occupant restraint device is in an in-use condition being a condition in which it performs a predetermined occupant restraint function.

14. A system according to claim 1 wherein the occupant presence indicator signal is signal indicative of whether a seat belt of a seat is secured in a deployed position.

15. A motor vehicle comprising a system according to claim 1.

16. A vehicle comprising a chassis, a body attached to said chassis, a plurality of wheels, a powertrain to drive said wheels, a braking system to brake said wheels, and a system according to claim 1.

17. A method of operating a controller configured to assume one of a plurality of respective states, wherein in a first state the first controller is configured to cause a powertrain to develop drive torque and cause a vehicle to operate in accordance with a target speed value, the method comprising:
determining if one or more vehicle doors are in an open or closed state, and
determining if an occupant is present in a seat of a vehicle,
the method comprising not permitting operation of the first controller in the first state in dependence on a determination whether a vehicle door is in an open state, or whether an occupant is present in a seat of a vehicle; wherein
when the controller is in the first state, and when it is determined that the door is not in the closed state or that an occupant is not present, operating the controller to transition to second state, wherein in the second state the controller is configured to cause application of a brake to one or more wheels thereby to prevent the vehicle from exceeding the target speed value, and is configured not cause a powertrain to develop positive drive torque to cause a vehicle to operate in accordance with the target speed value.

18. A non-transient carrier medium carrying computer readable code for controlling a vehicle to carry out the method of claim 17.

19. A processor arranged to implement the method of operating a controller configured to assume one of a plurality of respective states, wherein in a first state the first controller is configured to cause a powertrain to develop drive torque and cause a vehicle to operate in accordance with a target speed value, the method comprising:
determining if one or more vehicle doors are in an open or closed state, and
determining if an occupant is present in a seat of a vehicle,
the method comprising not permitting operation of the first controller in the first state in dependence on a determination whether a vehicle door is in an open state, or whether an occupant is present in a seat of a vehicle; wherein
when the controller is in the first state, and when it is determined that the door is not in the closed state or that an occupant is not present, operating the controller to transition to second state, wherein in the second state the controller is configured to cause application of a brake to one or more wheels thereby to prevent the vehicle from exceeding the target speed value, and is configured not cause a powertrain to develop positive drive torque to cause a vehicle to operate in accordance with the target speed value.

* * * * *